United States Patent [19]
Jeong et al.

[11] Patent Number: 5,822,066
[45] Date of Patent: Oct. 13, 1998

[54] POINT DIFFRACTION INTERFEROMETER AND PIN MIRROR FOR USE THEREWITH

[75] Inventors: Hwan J. Jeong, Los Altos; David A. Markle, Saratoga, both of Calif.

[73] Assignee: Ultratech Stepper, Inc., San Jose, Calif.

[21] Appl. No.: 806,663

[22] Filed: Feb. 26, 1997

[51] Int. Cl.⁶ .................................................. G01B 9/02
[52] U.S. Cl. ........................ 356/359; 356/354; 356/360
[58] Field of Search .................................. 356/345, 354, 356/359, 360, 363

[56] References Cited

U.S. PATENT DOCUMENTS

| | | | |
|---|---|---|---|
| 4,353,650 | 10/1982 | Sommargren . | |
| 4,682,025 | 7/1987 | Livingston et al. | 356/363 |
| 4,872,755 | 10/1989 | Kuchel . | |
| 5,076,695 | 12/1991 | Ichihara | 356/360 |
| 5,483,341 | 1/1996 | Naganuma | 356/345 |
| 5,485,275 | 1/1996 | Ohtsuka . | |
| 5,504,578 | 4/1996 | Kopf . | |
| 5,548,403 | 8/1996 | Sommargren | 356/354 |
| 5,557,408 | 9/1996 | Kanaya . | |
| 5,675,413 | 10/1997 | Prikryl et al. | 356/363 |

OTHER PUBLICATIONS

"A 3–D Numerical Study of Pinhole Diffraction to Predict the Accuracy of EUV Point Diffraction Interferometry," K.A. Goldberg et al., OSA TOPS on Extreme Ultraviolet Lithography, 1996, vol. 4, pp. 133–137.

"Phase Shifting Diffraction Interferometry for Measuring Extreme . . . " Gary E. Sommargren, OSA TOPS on Extreme Ultraviolet Lithography 1996, vol. 4, pp. 108–112.

Optical Shop Testing, "Common Path Interferometers," Section 3.7 Point Diffraction Interferometer, pp. 97–98, editor Daniel Malacara, 1978.

"Device Profiles Optics over Wide Spectral Range," Kristin Lewotsky Laser Focus World, pp. 41–42, Jan. 1997.

*Primary Examiner*—Samuel A. Turner
*Attorney, Agent, or Firm*—Allston L. Jones

[57] ABSTRACT

This invention includes a pin mirror arranged to receive light, preferably from a laser source. The pin mirror has a reflective surface that diffracts and reflects the received light to generate a diffraction-limited spherical wavefront. The pin mirror can reflect the wavefront in a predetermined direction by angling the pin mirror's reflective surface with respect to the direction of travel of the light incident to the pin mirror. The capability of the pin mirror to generate a diffraction-limited spherical wavefront and to direct the wavefront in a predetermined direction provides the capability to test objects or systems with relatively high numerical apertures, and yet allows for a reduction in the number and criticality of the properties of optical elements that would otherwise be required in an interferometer. The invention also includes several embodiments of interferometers that incorporate one or more pin mirrors to generate probe and reference beams used to generate an interference pattern indicative of one or more characteristics of a test object or system.

74 Claims, 20 Drawing Sheets

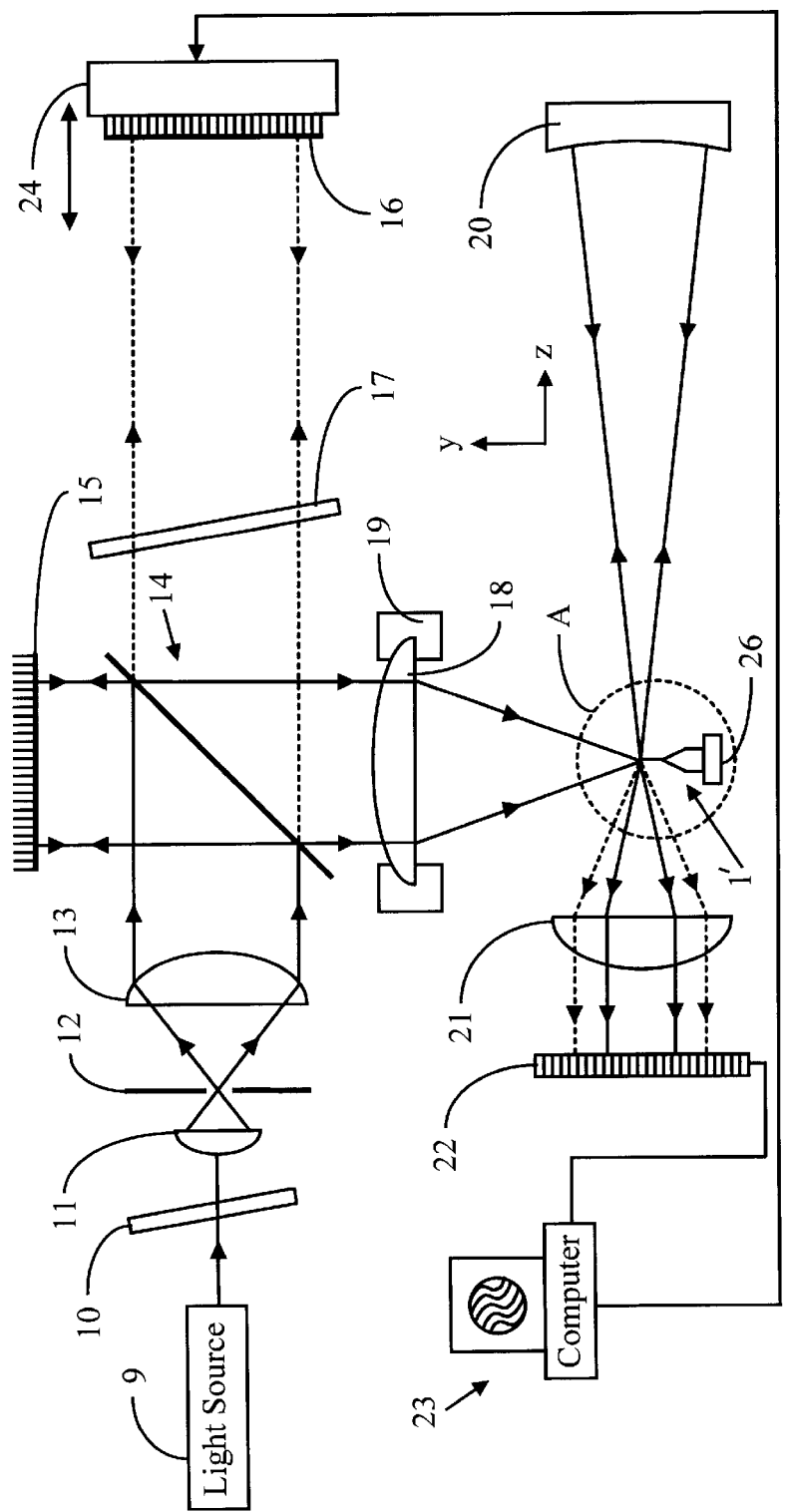
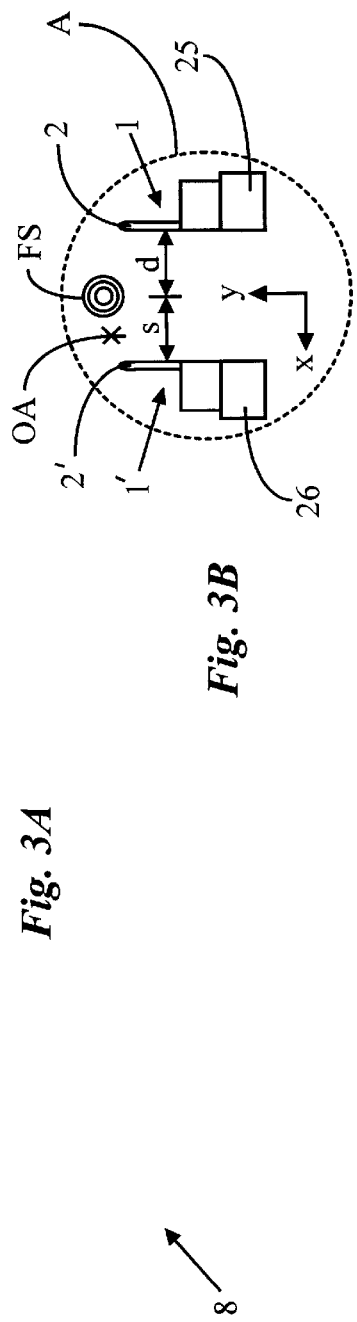
*Fig. 3A*
*Fig. 3B*

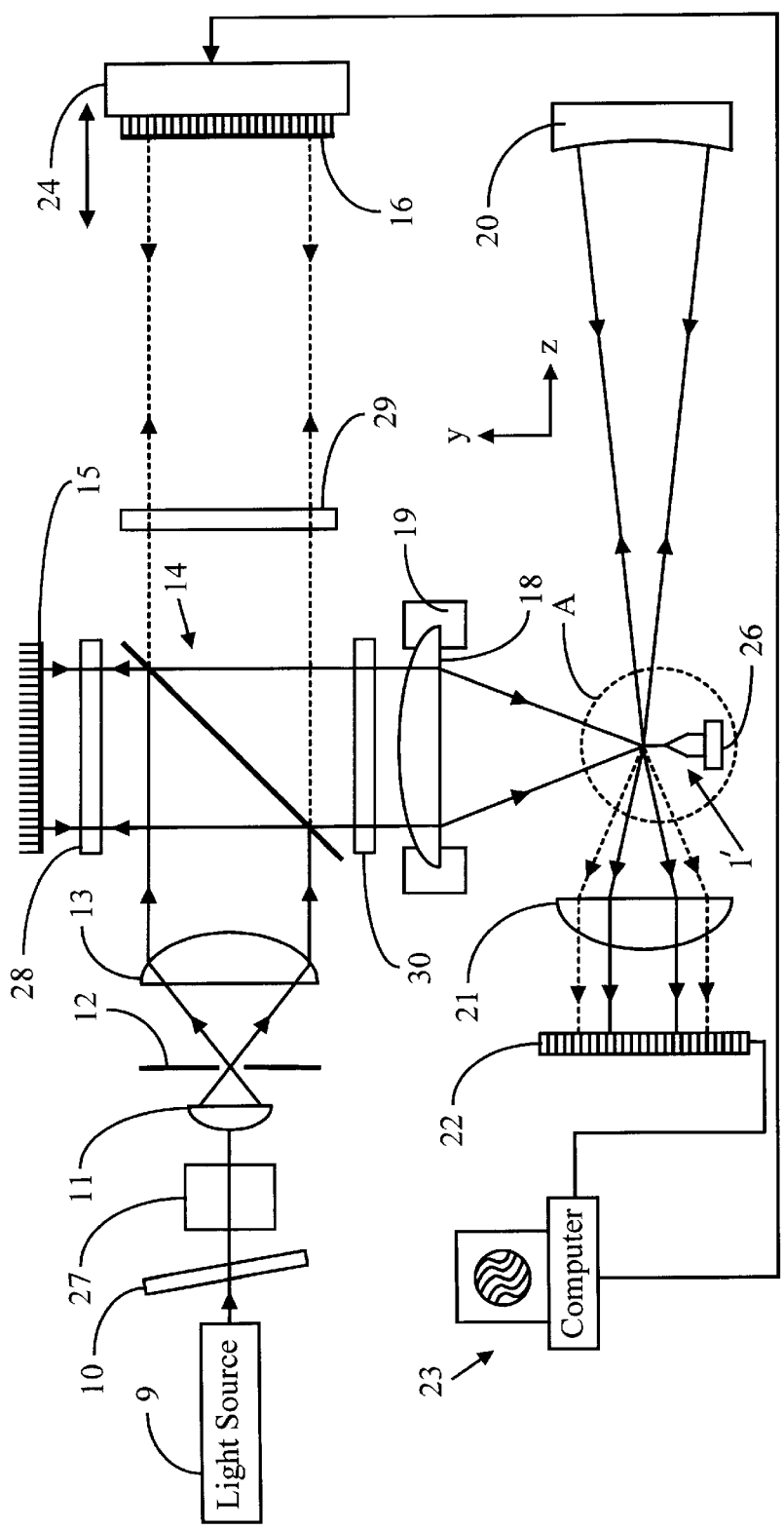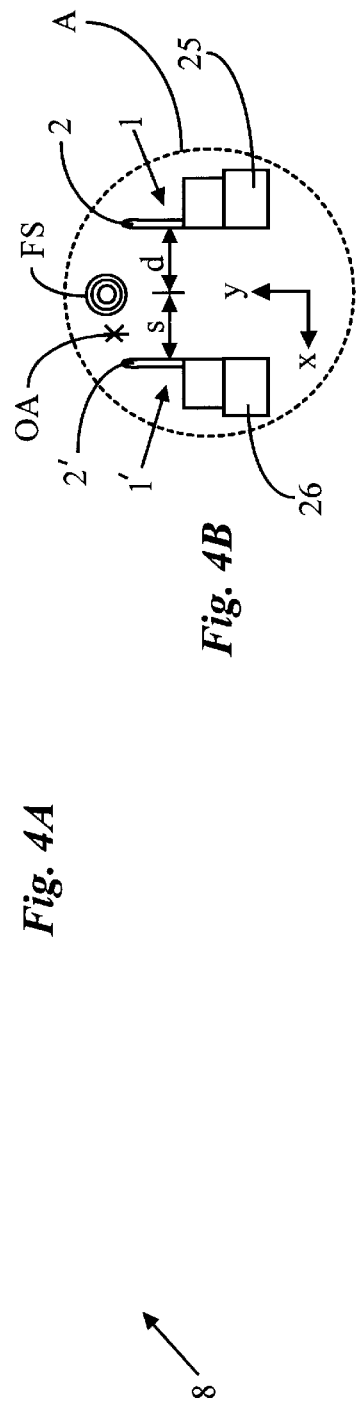
*Fig. 4A*
*Fig. 4B*

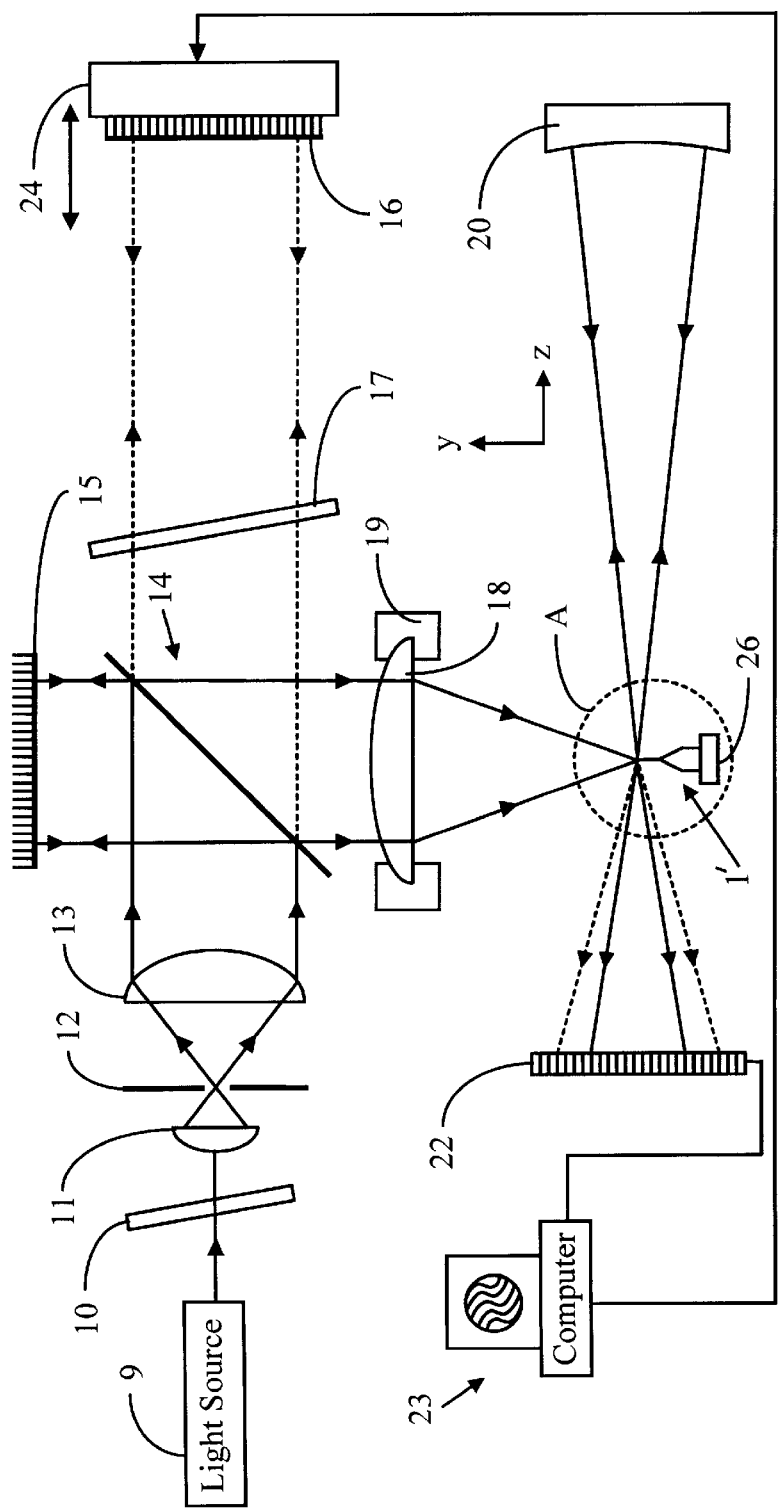
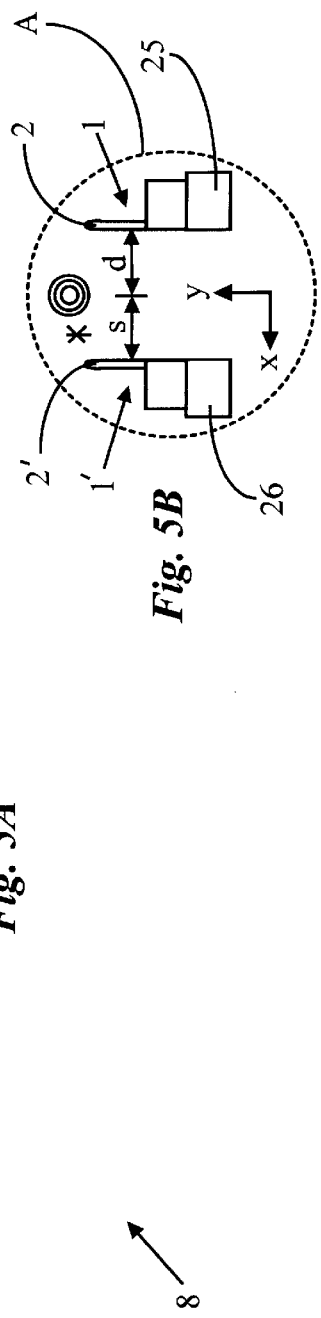
*Fig. 5A*
*Fig. 5B*

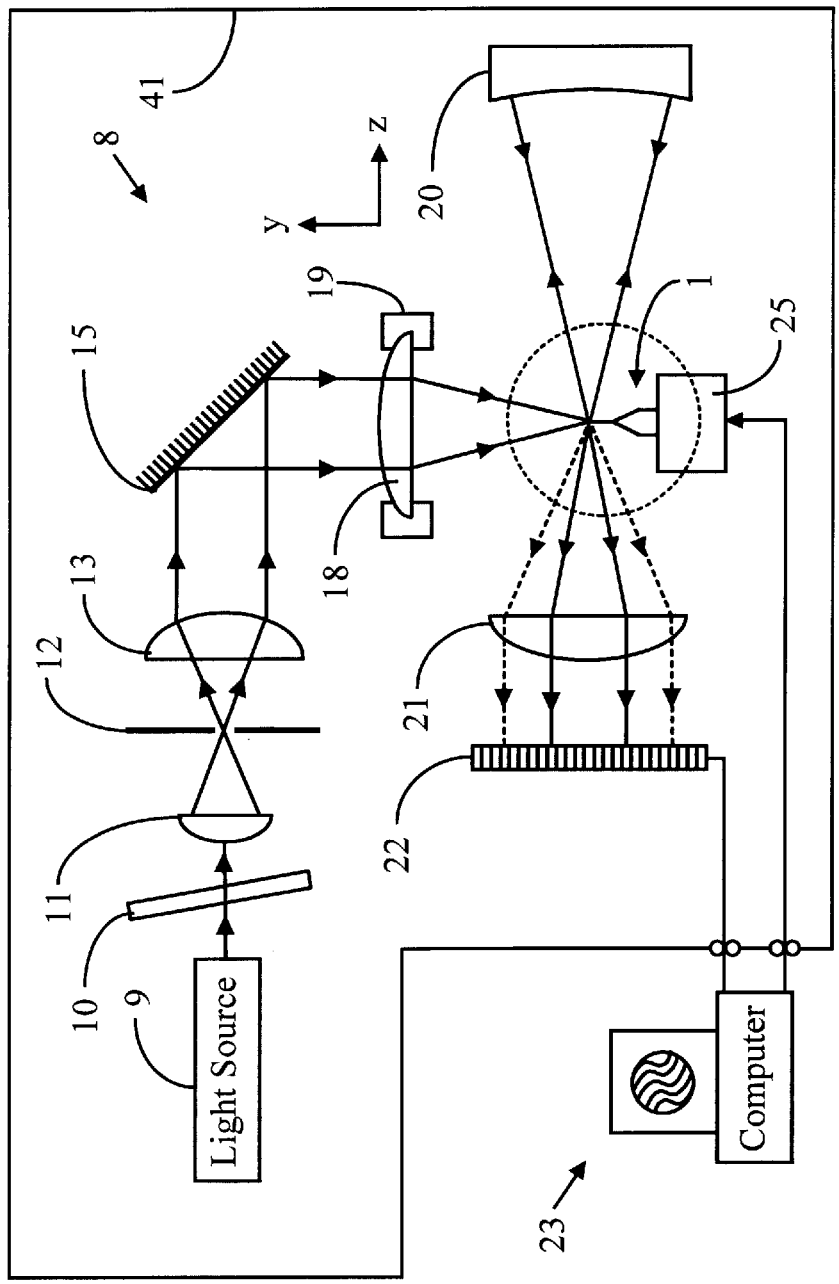
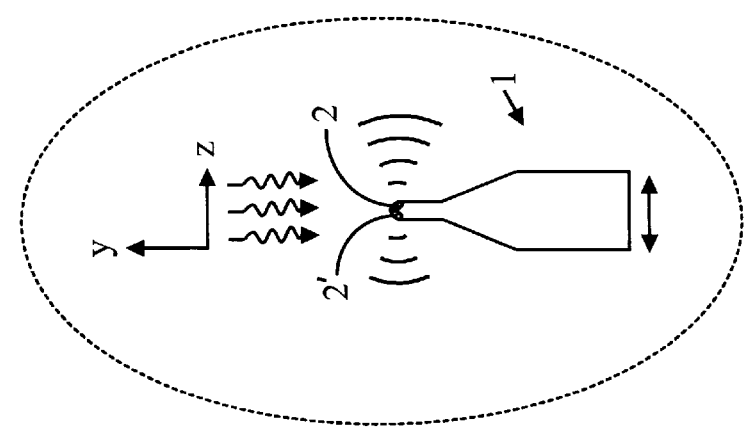
Fig. 19A
Fig. 19B

POINT DIFFRACTION INTERFEROMETER AND PIN MIRROR FOR USE THEREWITH

BACKGROUND OF THE INVENTION

1. Field of the Invention

This invention is directed to an apparatus that diffracts light to generate a spherical wavefront useful in interferometry applications. The invention is also directed to interferometers used in metrology to analyze figure or optical characteristics of a test object or system.

2. Description of the Related Art

Increasingly, in metrology, there is a need for an apparatus capable of making highly precise measurements. For example, with the progressively smaller size of integrated electronic or micro-mechanical devices, the light projection system used to perform photolithography to produce such devices is subject to ever more stringent design specifications. In order to meet these specifications, the optical elements of the projection system must have relatively precise surface shapes and other optical characteristics. To determine whether an optical element meets the required design criteria to function effectively in the light projection system, a highly accurate and precise metrology tool is required to measure and evaluate the optical element. The evaluation of an optical element of a projection system is but one example of an application in which highly precise measurements are required. Of course, there are a wide variety of other applications for high-precision metrology tools, including the analysis and evaluation of mechanical parts used in high-precision metrology systems (for example, high-precision stages, ultraflat platens, guide rails, etc.) and gauge blocks used for certified standard rulers, as well as for differential metrology, material stress measurement, thermal distortion analysis, and analysis of the effects of gravity upon an object, to specifically mention but a few examples.

Interferometers are often used for highly accurate and precise measurements of the figure or optical characteristics of an object. Interferometers operate by generating probe and reference light beams. The probe beam is directed to the test object that disturbs or delays the probe beam according to the characteristic(s) of the test object. By interfering the probe beam from the test object with the reference beam, an interference pattern can be generated that includes relative phase differences between the probe and reference beams that are indicative of the test object's characteristic(s).

The accuracy of many previous interferometers is severely limited by the presence of a reference surface in the reference beam path whose surface or alignment error cannot readily be determined or compensated by calibration. To overcome this problem, diffracted beams have been used for reference beams to eliminate the need for reference surfaces. One disclosed interferometer (referred to as "the Smartt/Steel interferometer") generates a diffracted reference beam from a pinhole defined in a semi-transparent plate (see "Theory and Application of Point-Diffraction Interferometers," authored by R. N. Smartt and W. H. Steel, printed in Proceedings of ICO Conference on Optical Methods in Scientific and Industrial Measurements, Tokyo, 1974, *Japan Journal of Applied Physics,* 14, Supplement 1, 351, published 1975) and other interferometers use the end of an optic fiber to generate a diffracted beam (see U.S. Pat. No. 5,548,403 issued Aug. 20, 1996 to sole inventor Gary E. Sommargren). In addition, gratings have been used in the reference beam paths of interferometers to generate and phase-shift diffraction-limited reference beams (see "A 3-D Numerical Study of Pinhole Diffraction to Predict the Accuracy of EUV Point Diffraction Interferometry," authored by K. A. Goldberg, E. Tejnil and J. Bokor, printed in *OSA TOPS on Extreme Ultraviolet Lithography,* Vol. 4, 133 published 1996 in Optical Society of America, and "Device Profiles Optics over Wide Spectral Range," authored by Kristin Lewotsky, printed at pages 41–42 in *Laser Focus World* in January 1997)(together referred to as "the diffraction grating interferometers").

Although the aforementioned interferometers are meritorious in some respects, each suffers from major disadvantages that gravely limit their effectiveness. Specifically, the Smartt/Steel interferometer lacks any device for shifting the phase of the reference beam relative to the probe beam, an omission that renders extraction of the phase information from the probe beam difficult if not impossible. A first interferometer disclosed in U.S. Pat. No. 5,548,403 splits a diffracted beam to generate the probe and reference beams, thereby limiting the numerical aperture of the test object that can be measured with the interferometer by at least a factor of one-half relative to the numerical aperture that could be measured if the reference and probe beams were generated independently, a distinct disadvantage. A second interferometer disclosed in U.S. Pat. No. 5,548,403 generates diffracted probe and reference beams independently by emission of light from a common laser source from the ends of two optic fibers, one of which has a reflective metallic film formed on its end. The diffracted probe beam generated by emission from the first optic fiber passes through a converging lens under test, that focuses the probe beam onto the reflective film of the second optic fiber. The reference beam is diffracted by emission through the reflective film at the end of the second optic fiber, and interferes with the probe beam reflected from the film. As a requirement for operation of the second interferometer of U.S. Pat. No. 5,548,403, the probe beam must not spatially overlap with itself after reflection from the metallic reflective surface of the optic fiber emitting the reference beam. This requirement severely limits the numerical aperture (or solid angle) of the probe beam. Thus, the interferometers of U.S. Pat. No. 5,548,403 are restricted for use with test objects with relatively low numerical apertures. Also, the embodiments of the interferometers of U.S. Pat. No. 5,548,403 require metallic reflective surfaces on a plate in the first interferometer, or at the end of an optic fiber in the second interferometer. Such metallic surfaces heat when irradiated, and generate disturbances and introduce noise into the reference and probe beams, thus reducing the precision of measurements made with the interferometer. The interferometers using the diffraction gratings can be used to test objects or systems with widely separated object and image points. However, the effectiveness of the diffraction grating interferometers are severely limited in use for a single test surface with narrowly separated object and image points. In addition, measurements with the diffraction grating interferometers suffer from errors in the grating slits and the figure and alignment errors of their gratings. It would be desirable to provide an interferometer capable of high-precision metrology that overcomes the above-noted deficiencies of previous interferometers.

SUMMARY OF THE INVENTION

This invention overcomes the above-noted deficiencies. An apparatus in accordance with this invention includes a pin mirror arranged to receive light, preferably from a laser source. The pin mirror has a relatively small reflective surface that diffracts and reflects the received light to generate light with a diffraction-limited spherical wavefront. By appropriately angling the reflective surface with respect to the direction of travel of the received light, the pin mirror can direct the wavefront in a predetermined direction. The capability of the pin mirror to generate a diffraction-limited spherical wavefront and to direct the wavefront in a predetermined direction can be used advantageously in an interferometer incorporating the pin mirror to reduce the number and criticality of the properties of optical elements required in the interferometer.

To generate the diffraction-limited spherical wavefront, the largest cross-width dimension of the pin mirror's reflective surface is made less than $\lambda/NA$, where $\lambda$ is the wavelength of the light, and where NA is the numerical aperture of a test object to be analyzed by an interferometer incorporating the pin mirror. In one embodiment, the pin mirror can be made by polishing the end of a reflective metal pin to form a substantially flat reflective surface. The apparatus can include a base to which the pin mirror is mounted. The metal pin mirror absorbs significant light and will therefore heat. To prevent the heat from disturbing air in proximity to the reflective surface, the pin mirror and base have a relatively high thermal conductivity so that the base sinks and dissipates heat away from the pin mirror's reflective surface. In addition, the base preferably has angled shoulders to which the pin mirror is mounted, that deflect stray light that misses the pin mirror's reflective surface, away from paths traveled by the probe and reference beams. The shoulders therefore help to prevent stray light from adversely affecting the probe or reference beams generated by a pin mirror.

Preferably, however, the pin mirror is made with an optic fiber. The optic fiber's end can be polished to form a reflective surface at the fiber's end. The optic fiber's reflective surface can include a dielectric coating to increase its reflectivity. The pin mirror made with the optic fiber will be less efficient in reflecting light than pin mirrors made with metal. However, an optic fiber, being made of glass, absorbs no appreciable light and consequently will not heat if irradiated. Thus, the enhanced reflection efficiency of metal pin mirrors is preferably sacrificed for the suppression of heat-generated noise by using an optic fiber without any metal surface that could heat and disturb the atmosphere through which the probe and reference beams travel, particularly in the vicinity of the reflective surface of a pin mirror. The invented apparatus can include a light trap coupled to the end of the optic fiber, that traps and absorbs the light from the optic fiber's second end to prevent its retransmission through the fiber back to the reflective surface.

The surface of the pin mirror can be made substantially convex to diffract light in a larger solid angle, or equivalently, to generate a diffracted beam with a larger numerical aperture. The convex pin mirror surface can be used to great advantage in an interferometer for measuring the characteristic(s) of a test object with a relatively high numerical aperture.

The use of two separate pin mirrors for the generation of respective probe and reference beams, is preferred in the invented apparatus. However, the apparatus can include a single pin mirror with two reflective surfaces, one to generate the probe beam and the other to generate the reference beam. The single pin mirror with dual reflective surfaces can be used in an interferometer to simplify its configuration.

The invention also includes several embodiments of interferometers that include one or more pin mirrors, that are useful for detecting a characteristic(s) of a test object, such as surface figure or surface figure error, or optical properties such as the homogeneity of refractive index, field curvature, magnification, distortion, or chromatic aberrations. In several embodiments, the interferometer generally includes a light source, a beam splitter, a probe pin mirror and a reference pin mirror. The light source is preferably a laser, that generates light supplied to the beam splitter. The beam splitter functions to divide the light into probe and reference beams for irradiation onto respective probe and reference pin mirrors. Several of the embodiments of the interferometer include at least one mirror that is used in conjunction with the beam splitter to equalize the lengths of the paths traveled by the probe and reference beams. Several of the embodiments of the interferometer also include at least one mirror arranged in either the probe or reference beam path, that can be moved to introduce a relatively small variation of the distance traveled by one of the beams relative to the other beam, to cause a shift in relative phase between the beams. The interferometers can include an actuator, preferably piezoelectric, that is coupled to the mirror, and that moves the mirror by a relatively small amounts to introduce a desired phase shift between the probe and reference beams. The phase shift introduced by the mirror can be used to obtain a plurality of data sets for respective interference patterns generated by the probe and reference beams at different relative phase shifts. The multiple data sets can be used to completely or more precisely quantify a characteristic of the test object.

The probe and reference pin mirrors are arranged to receive respective probe and reference beams from the beam splitter. Preferably, at least one focusing lens is used to focus the probe and reference beams divided by the beam splitter, onto respective pin mirrors. The probe pin mirror diffracts the probe beam to form a diffraction-limited spherical wavefront, and directs the diffracted probe beam toward the test object. The reference pin mirror is arranged to receive the reference beam from the beam splitter, and diffracts the reference beam to generate a diffraction-limited spherical wavefront based on the reference beam. The reference pin mirror directs the diffracted reference beam in a direction to interfere with the probe beam reflected from or traveling through the test object to generate an interference pattern indicative of at least one test object characteristic.

The interferometer preferably includes a detector arranged to receive the interference pattern, that generates an electric signal based on the interference pattern. The detector can be a device such as a two-dimensional charge-coupled device (CCD) array or a charge-injection device (CID) array. The apparatus can also include a computer coupled to receive the signal from the detector, and that generates a display indicative of at least one characteristic of the test object, based on the signal. The actuator can be coupled to and controlled by the computer to increment the relative phase shift between the probe and reference beams to obtain successive data sets for the interference patterns to automate the determination of the test object's characteristic(s). The invented interferometer includes several embodiments suitable to analyze a test object with a concave, convex, flat, elliptical, parabolic, or hyperbolic surface, or an optical system.

In embodiments of the interferometer in which the probe and reference pin mirrors are substantially separated from each other (as they are in interferometers in which the probe beam is transmitted through a lens or system to determine its characteristics), a pinhole or a single mode optic fiber can replace the probe pin mirror to provide size reduction and/or to simplify construction of the interferometer.

In addition, one or more of the aerial light paths traveled by the light through the interferometer can be replaced with a respective optic fiber to allow bending of the light paths. In some interferometers, the optic fiber(s) can simplify the configuration and construction of the interferometer.

In some embodiments of the invented interferometer, the presence of the probe or reference pin mirror in the path of the probe beam returning from the test object can block a portion of the probe beam from reaching the detector. In such embodiments, the apparatus can include a movable stage or stages upon which one or both of the probe and reference pin mirrors are mounted. The stage(s) allow the pin mirror(s) to be positioned at different locations in a direction transverse to the path traveled by the return probe beam so that the pin mirror(s) can be moved to different non-overlapping regions in the focal spot area of the return probe beam. By taking two measurements with the pin mirror(s) positioned at different locations, the data resulting from the first measurement of the test object characteristics obtained by the detector, can be supplemented with data corresponding to the blocked light from the second or subsequent measurement with the pin mirror(s) located at a different location. The computer can be coupled to the stage, and programmed to automate the measurement process by moving the stage(s) between different pin mirror positions, and reading and storing the signal generated by the detector at each pin mirror position. The computer can subsequently process the stored supplemented data set to generate or quantify a test object characteristic.

In an additional embodiment, the interferometer includes a light source and a pin mirror with at least two reflective surfaces. The light source is preferably a laser, that generates light supplied to the pin mirror. The first reflective surface of the pin mirror diffracts and reflects light to generate a probe beam that travels toward the test object, and the pin mirror's second reflective surface diffracts and reflects light to produce the reference beam that travels in a different direction relative to the direction in which the probe beam travels to the test object. The probe beam reflects from the test object whose curvature focuses the return probe beam to a point in near proximity to the pin mirror's end. The return probe beam interferes with the reference beam to generate an interference pattern indicative of at least one characteristic of the test object. As with the previously-described embodiments of the interferometer, this embodiment of the interferometer can include a detector arranged to receive the interference pattern, that generates an electric signal, and can also include a computer coupled to receive the signal from the detector, that generates a display based on the signal, that is indicative of at least one characteristic of the test object. To affect phase-shift of the probe beam relative to the reference beam, the pin mirror can be mounted in a movable stage. The measurement process can be automated by programming the computer to generate and output a stage control signal supplied to the stage to move the stage in successive increments at which the computer reads and stores the signal generated by the detector. The computer can then process and analyze the stored interference patterns to generate a display indicative of the test object's characteristics.

The invented interferometer apparatuses can include an enclosure in which at least one of the probe and reference pin mirrors are situated. The enclosure contains an environment such as an inert gas or a vacuum, to prevent heat caused by the light incident to the pin mirror(s) from introducing noise into the interference pattern generated by the probe and reference beams.

These together with other features and advantages, which will become subsequently apparent, reside in the details of construction and operation as more fully hereinafter described and claimed, reference being made to the accompanying drawings, forming a part hereof, wherein like numerals refer to like parts throughout the several views.

BRIEF DESCRIPTION OF THE DRAWINGS

FIGS. 3A and 3B are views of a first embodiment of an interferometer in accordance with this invention for use with a test object with a concave surface;

FIGS. 4A and 4B are views of a second embodiment of the interferometer for use with a test object with a concave surface;

FIGS. 5A and 5B are views of a third embodiment of the interferometer for use with a test object with a concave surface;

FIGS. 19A and 19B are views of a fourteenth embodiment of the invented interferometer for use with a test object with a concave surface.

DESCRIPTION OF THE PREFERRED EMBODIMENTS

Figure 1:
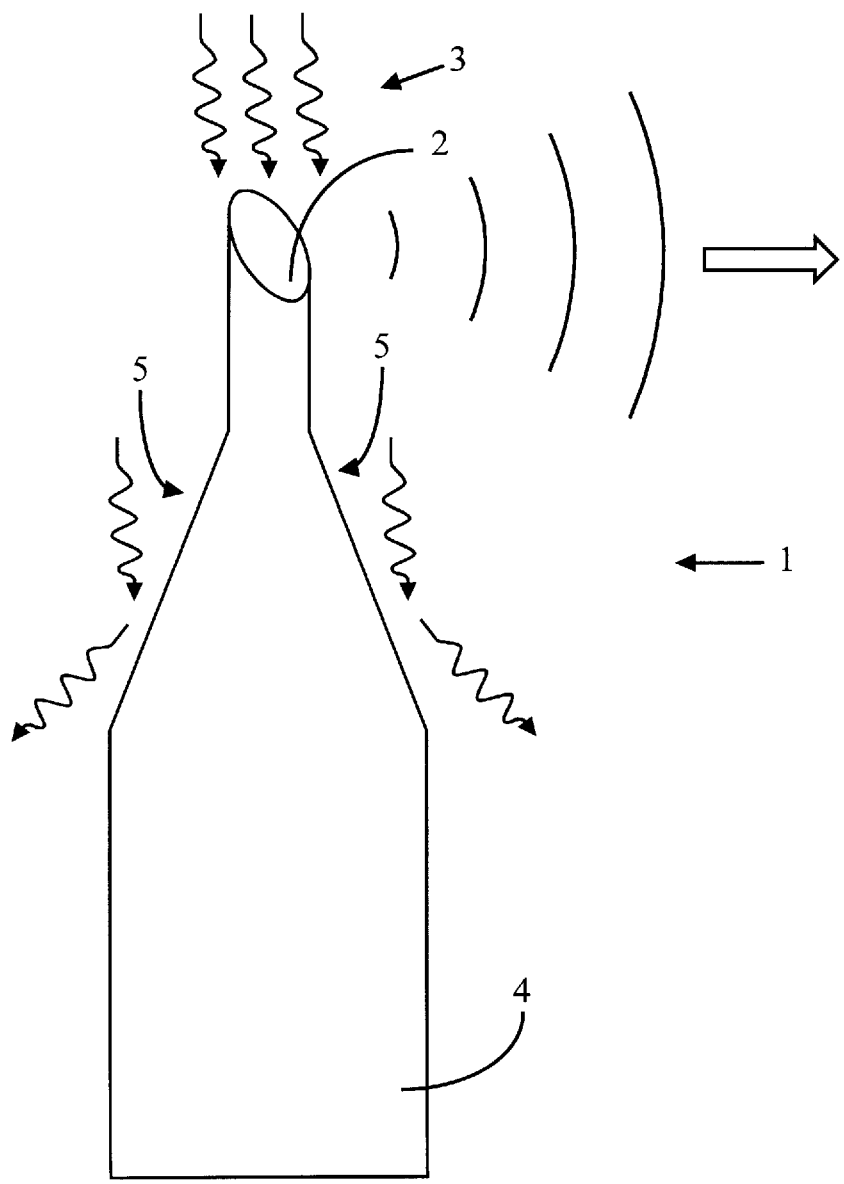
FIG. 1 is a perspective view of a first embodiment of a pin mirror in accordance with this invention.

In FIG. 1, a first embodiment of a pin mirror 1 in accordance with this invention is shown. The pin mirror has a reflective surface 2 defined at its end, that diffracts light 3 incident to the reflective surface to generate light with a diffraction-limited spherical wavefront. The pin mirror can be arranged relative to the light's incidence direction so that the diffracted light is reflected from the pin mirror's reflective surface in a predetermnined direction. The capability of the pin mirror to diffract and reflect the light in a desired direction are important features of the invented pin mirror that make its use in an interferometer highly advantageous, as will subsequently become more apparent.

The pin mirror of FIG. 1 can be formed from a relatively thin, elongated pin-like member. The pin mirror is preferably formed of a rigid material so that the pin mirror can be readily fixed in position. Due to its thinness, and hence relative fragility, the pin mirror should also be made of relatively durable material. For example, the pin mirror can be formed from an appropriate reflective metal. Alternatively, some dielectric materials such as glass fibers or crystals can be used for the pin mirror, and these materials can yet reflect sufficient light to be used effectively. The reflective surface is preferably made by polishing the end of the pin mirror to a flat surface whose normal is centered between the light's incidence and reflected directions when the pin mirror is properly positioned to receive the incident light. Alternatively, the surface can be substantially convex to diffract the light over a broad solid angle. In other words, the convex pin mirror surface generates a relatively high numerical aperture beam. If the pin mirror is made of a dielectric material with a reflection efficiency that is insufficient, the reflective surface can be coated with an appropriate dielectric material to increase its reflectivity.

The largest dimension across the reflective surface 2 should be less than $\lambda/NA$, where $\lambda$ is the wavelength of the light, and where NA is the numerical aperture of a test object to be analyzed by an interferometer incorporating the pin mirror. This constraint on the size of the pin mirror's reflective surface ensures that the reflected surface will diffract light with a numerical aperture adequate to effectively measure a desired characteristic(s) of the test object. Irregularities in the surface shape of the pin mirror's reflective surface can impact the light intensity distribution, but not the sphericity, of the diffraction-limited wavefront generated by the pin mirror. Nonetheless, it is preferred that the pin mirror's surface be relatively smooth to produce a wavefront with uniform intensity as well as sphericity.

The irradiation of the reflective surface 2 with the incident light can heat the pin mirror as high as 100° Celsius or more. The heated pin mirror heats the air in proximity to the reflective surface, causing distortions of the wavefront of the light diffracted by the pin mirror's reflective surface. To prevent such distortions, the pin mirror can be mounted or soldered to, or formed integrally with, a base 4 that has a relatively large volume to serve as a reservoir for heat generated by the pin mirror, and that also has a relatively large area to dissipate heat in locations sufficiently distant from the pin mirror's reflective surface so as not to disturb the spherical wavefront generated by the reflective surface. If the pin mirror is made of a material that heats significantly upon irradiation with the incident light, to allow significant transfer of heat away from the pin mirror's reflective surface, both the pin mirror and the base in the embodiment of FIG. 1 should preferably be made of a material with a relatively high thermal conductivity, such as metal.

Preferably, the base has shoulders 5 that taper outward from the bottom end of the pin mirror in FIG. 1. As so tapered, the shoulders are angled to reflect stray light in a direction away from the diffracted light generated by the pin mirror so that its spherical wavefront is not disturbed by the stray light.

Figure 2:
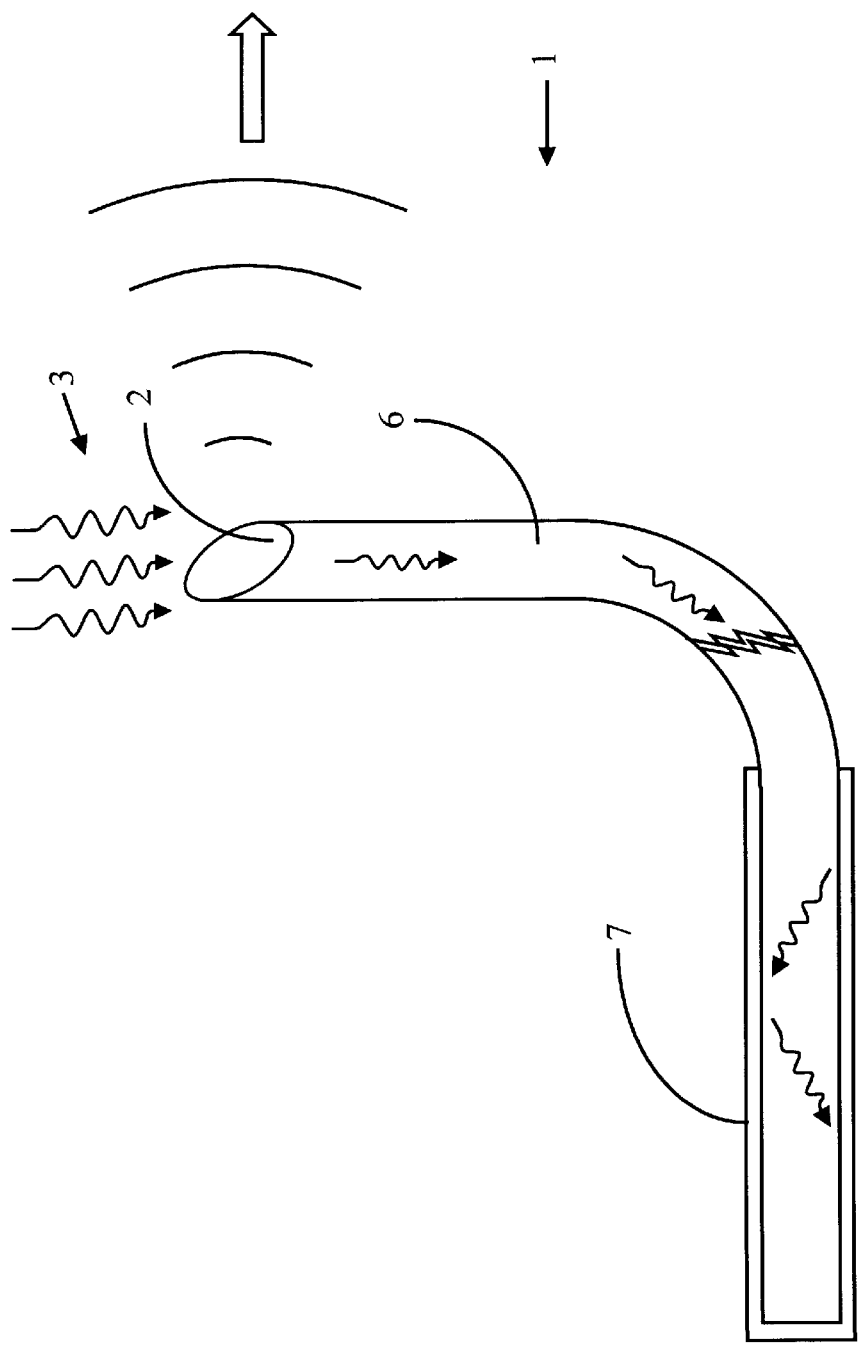
FIG. 2 is a partial perspective, partial cross-sectional view of a second embodiment of a pin mirror with coupled light trap.

FIG. 2 is a second, preferred embodiment of the pin mirror 1 in accordance with this invention. The pin mirror 1 of FIG. 2 includes a fiber 6 that transmits light in its interior along its longitudinal axis. The fiber 6 has a reflective surface 2 that is similar in configuration and function to that of the pin mirror of FIG. 1. More specifically, the reflective surface of the fiber 6 reflects and diffracts incident light to generate a diffraction-limited spherical wavefront. The fiber's reflective surface reflects about 5% to 25% of the incident light, depending upon the refractive index of the fiber material, the incidence angle and the incident light's polarization status. The remaining 95% to 75% of the light incident to the reflective surface refracts into the fiber 6, and a significant portion, if not all, of the refracted light travels through the fiber 6. Because the fiber 6 is transmissive, the light is not significantly absorbed by the fiber in proximity to the reflective surface, and accordingly, the fiber generates no appreciable heat that would adversely affect the spherical wavefront of the diffracted light generated by the reflective surface.

The second end of the fiber 6 opposite the surface 2 transmits light to a light trap 7 shown in cross-section in FIG. 2, that encloses the fiber's second end. The light trap encloses the fiber's second end in a light-tight manner to prevent the escape of light from the trap. Also, the light trap has opaque walls to absorb the light to prevent appreciable transmission of the light back into the fiber 6 after the light enters the trap.

The pin mirror of FIG. 2 can be made using a conventional single mode optic fiber as a starting material. However, conventional optic fibers have core diameters that are much larger than $\lambda/NA$ for typical light wavelengths $\lambda$ and test object numerical apertures NA, and must be reduced significantly in size to produce the reflective surface of the invented pin mirror that is sufficiently small to diffract light incident to the surface. The pin mirror's fiber 6 can be formed from a single mode optic fiber by removing the cladding and much of the core of the fiber by etching with an acid solution, for example, until the fiber has a diameter sufficiently small so that the reflective surface 2 can be made substantially on the entire end surface of the fiber with its largest cross-surface dimension smaller than $\lambda/NA$. More preferred, however, the pin mirror of FIG. 2 is formed by heating a single mode optic fiber to a relatively high temperature at which the fiber becomes at least partially molten, and by pulling the heated fiber to stretch the fiber along its longitudinal axis to reduce the fiber's diameter. The fiber is cut and polished to form the reflective surface angled so that incident light is reflected in the desired direction when the fiber 6 is fixed in position. The cladding of the fiber is preferably kept on the optic fiber until the end is polished to form the reflective surface, after which the cladding and part of the core, if necessary, can be removed by etching, for example, to reduce the cross-width size of the reflective surface below $\lambda/NA$.

A light trap 7 can be made by forming a light-absorbent coating such as an opaque paint or the like, on the end of the fiber 6. The trap's coating is formed uniformly around the entire circumference of the fiber over a length of the optic fiber sufficiently large to absorb all of the light traveling in the fiber. Preferably, in the region to which the light trap is applied to the fiber, the cladding of the fiber 6 has been removed so that the fiber leaks light. Also, the coating should absorb a broad spectrum of light wavelengths (from extreme ultraviolet to deep infrared, for example) but should at least absorb the light wavelength(s) with which the pin mirror is intended to be used. Further, to prevent the fiber from heating significantly, the coating is preferably applied over a relatively large area so that enough heat can be dissipated from the coating when heated by the absorption of light traveling in the fiber, so that the reflective surface at the fiber's opposite end is not significantly heated to prevent disturbance of the spherical wavefront generated by diffraction of light incident to the reflective surface. However, the coating is applied relatively distant from the reflective surface to prevent the heat generated and dissipated at the coating from disturbing the wavefront of the light diffracted from the reflective surface. The length of the coating that must be applied to the fiber to absorb all light can be determined by calculating the amount of light entering the fiber and the amount of light leakage from the fiber per unit fiber length, either theoretically or by measurement, and by substituting these calculated amounts into Beer's law.

FIGS. 3A and 3B are views of a first embodiment of an interferometer 8 in accordance with this invention that includes the elements describe below. In FIG. 3A, a light source 9 generates and outputs monochromatic coherent light. The light wavelength generated by the source 9 can be any wavelength that can be reflected by the pin mirror, including light in the extreme ultraviolet to deep infrared wavelength range.

An attenuator 10 is arranged to receive the light generated by source 9. The attenuator 10 reduces the intensity of the light from source 9 to a fraction of its output intensity so that the interference pattern generated by the interferometer is not saturated.

A positive lens 11 is arranged to receive the light from the attenuator 10. The positive lens 11 focuses the received light to a pinhole defined in an opaque filter 12. Light passing through the pinhole strikes collimating lens 13 that collimates the previously divergent light from the filter's pinhole. The filter serves to block stray light from impacting the performance of the system. The lenses 11, 13 act as a beam expander to increase the width of the light beam relative to its width at the output of the source 9.

From the collimating lens 13, the light beam travels to a beam splitter 14. In FIG. 3A, the beam splitter has mirrors 15, 16 opposing respective sides of the beam splitter. A portion of the light incident to the input side of the beam splitter is reflected at the beam splitter's partially-reflective, partially-transmissive interface to form the probe beam. The probe beam reflects from the mirror 15, passes through and is output from the beam splitter 14. The remaining portion of the light incoming to the beam splitter 14 passes through the beam splitter's interface as the reference beam, reflects from the mirror 16 back to the beam splitter where it reflects from the beam splitter's interface and exits the beam splitter 14. If the interferometer is required to be desensitized against inadvertent mirror tilting, the mirrors 15, 16 can be replaced with retroreflecting prisms or corner cubes.

The mirror 16 is relatively distant from the beam splitter compared to the mirror 15. This arrangement is used to equalize the optical paths ultimately traveled by the probe and reference beams in the interferometer so that the relative difference in optical paths of the probe and reference beams, is less than the coherence length of the laser light. Alternatively, the arrangement of the mirrors 15, 16 can be made so that the reference or probe beams have a path difference length that is an even number times the laser cavity length of the source 9.

To spatially offset the probe and references beams, the beam splitter 14 or the mirrors 15, 16 are tilted slightly, typically by a few arc minutes, away from a normal attitude with respect to the light incident to their surfaces, in a manner that offsets the probe and reference beams. The required tilt of the beam splitter 14 or the mirrors 15, 16, expressed in radian units, is one-half of the spatial separation of the corresponding pin mirror from the optical axis, divided by the focal length of lens 18 (described in more detail below) used to focus the light output by the beam splitter onto the probe and reference pin mirrors. The tilt of the mirrors 15, 16 not only achieves the desired result of spatially offsetting and separating the probe and reference beams, but also prevents back reflections from returning to the light source, a situation that could affect the stability of the source particularly if implemented as a laser. The presence of filter 12 also helps to block back-reflected light from adversely affecting the light source 9.

To adjust the fringe contrast of the interference pattern generated by the probe and reference beams, an attenuator 17 is positioned between the beam splitter 14 and the mirror 16. The attenuator 17 can thus be used to adjust the relative intensity of the probe and reference beams. Although the attenuator 17 is situated in the reference beam path in FIG. 3A, the attenuator could alternatively be positioned between the beam splitter 14 and the mirror 15 to attenuate the probe beam. As a further alternative, in addition to the attenuator 17 situated in the reference beam path, an additional attenuator can be positioned between the beam splitter 14 and the mirror 15, to control the attenuation of both of the probe and reference beams. All of the above alternatives provide the capability to adjust the relative intensity of the probe and reference beams, and hence the fringe contrast of the interference pattern generated with the probe and reference beams.

A focusing lens 18 is arranged to receive the offset probe and reference beams from the beam splitter 14. The lens 18 focuses the probe and reference beams onto respective pin mirrors that can have configurations in accordance with either of the embodiments of FIGS. 1 and 2. The focusing lens 18 can be mounted to a stage 19 capable of moving the lens 18 toward or away from the probe and reference pin mirrors, to focus the probe and reference beams on respective pin mirrors.

To distinguish the probe and reference pin mirrors, the probe pin mirror will be designated with the numeral "1" and the reference pin mirror will be designated with the numeral "1'." In FIG. 3A which shows the interferometer 8 in the y-z plane of orthogonal x-, y-, and z-axes, the reference pin mirror 1' is visible but the probe pin mirror 1 is not shown as it is blocked from view by the reference pin mirror. FIG. 3B shows area A of FIG. 3A that is circled in broken line, in the x-y plane. The probe and reference pin mirrors 1, 1' are spatially separated along the x-axis. Due to the relatively small size of the reflective surface 2 of the probe pin mirror 1, the probe beam incident to the probe pin mirror is diffracted and has a spherical wavefront. Due to the angling of the probe pin mirror's reflective surface, the diffracted probe beam is directed to test object 20 that has a concave surface in FIG. 3A. The test object is positioned so that the focal spot FS of the probe beam returning from the test object, is situated approximately midway between and in the same x-y plane as the reference and probe pin mirrors. From the focusing lens 18, the reference beam impinges on the reflective surface of the reference pin mirror that diffracts and is angled to reflect the reference beam toward imaging lens 21 and detector 22. The return probe beam also travels from the focal spot FS to the lens 21 and detector 22 to interfere with the reference beam to form an interference pattern indicative of the test object's surface figure characteristic.

The detector 22 can be one of a variety of detectors such as a two-dimensional charge-coupled device (CCD) array or a charge-injection device (CID) array, and generates an electric signal such as a data frame or set with respective pixel values, based on the interference pattern. If desired, the surface figure error of the test object can be measured with a single measurement, in which case the detector should receive the probe beam without any significant loss of light. The amount of lost light power that can be tolerated to achieve measurements within a desired maximum measurement error, is proportional to the square of the maximum measurement error. Therefore, for example, if the desired maximum measurement error is $\lambda/100$, $\lambda$ being the light wavelength generated by source 9, the maximum amount of light power that can be lost is:

$$p_{max}=(\Delta\phi_{max})^2=(2\ \pi/100)^2 \approx 0.004 \quad (1)$$

where $p_{max}$ is the maximum amount of power loss that can be tolerated to achieve the desired measurement error, and $\Delta\phi_{max}$ is the maximum allowable phase error of the probe wavefront due to the light loss.

Most two-dimensional array detectors are made primarily from materials such as silicon, that are reflective. To prevent back-reflections that could disturb the reference or probe beams, the detector can be tilted slightly by 1° or 2° from a normal orientation with respect to the direction of incidence of the probe and reference beams.

A computer 23 is coupled to receive the signal generated by the detector 22. The computer can be one of a wide variety of commercial devices including an Intel® 80386™ processor-based personal computer, its equivalent, or a more advanced personal computer. Preferably, the personal computer includes a video or data card (not shown) to serve as a data interface coupled to receive the signal from the detector. The computer's processor is coupled to the data interface card, and receives and stores data frames output by the detector in a memory (not shown) to which the processor is coupled. One or more data frames are defined herein as a 'data set' or 'measurement.' The computer's processor can also read and display the frame data or set from its memory on the computer's display so that a human operator can observe the interference pattern or data generated by the interferometer. Preferably, the computer's processor is also coupled via an interface (not shown) to an actuator 24 to which the mirror 16 is attached. The actuator 24 can be a piezoelectric element capable of moving the mirror 16 by relatively slight amounts on the order of the wavelength of the light generated by source 9. The computer 23 can be coupled to the actuator 23 to control the electrically-induced expansion or contraction of the actuator's piezoelectric element and hence the position of the mirror 16. Preferably, the computer captures data frames at successive increments of the actuator 24 that shifts the phase of the probe or reference beams so that the observed characteristic of the test object 20 (which is the surface figure in FIG. 3A) can be completely determined by the computer using a commercially available software packages such as OptiCode™ produced by Phase Shift Technology™, Inc. of Tuscon, Ariz., Vision™ produced by Wyko™ Corporation of Tuscon, Ariz., or MetroPro™ produced by Zygo™ Corporation of Middlefield, Conn., that treat each pixel in the detector independently of other pixels and calculate figure characteristics of the test object from the light's intensity variation during phase shifting.

The use of the pin mirrors 1, 1' relaxes the requirements upon many of the optical elements used in the interferometer, and thus reduces the complexity and expense of an interferometer incorporating the pin mirrors. More specifically, the quality of optical elements such as the lenses 11, 13, the beam splitter 14, the mirrors 15, 16, and the focusing lens 18, are not critical because the pin mirrors generate diffraction-limited spherical wavefronts regardless of the aberrations present in the light incident to the pin mirrors. Moreover, the quality of the optical element(s) that succeed the pin mirrors, such as the imaging lens, are also not critical to to the interferometer's performance because both the probe and reference beams take nearly the same paths through the lens 21 and consequently acquire the same aberrations that null each other upon interference of the probe and reference beams. There can be a difference between the aberrations of the probe and reference beams caused by the lens 21 that is relatively small, but which may not be negligible for some applications. For applications that so require, the difference in aberrations of the probe and reference beam caused by the lens 21 can be measured and stored in the computer's memory for use in compensating the data generated by the detector during measurement of the test object characteristic of interest.

In the interferometer of FIGS. 3A and 3B, the optical elements, if not supported by other elements of the interferometer, can be supported with holders and other devices that are commercially available and whose use is well-known to those of ordinary skill in this technology. In this and subsequent embodiments of the invented interferometer, it may be assumed that such holders or optical element orientation and alignment devices can be used to support an optical element of the interferometers without specific illustration or description of such devices.

In FIGS. 3A and 3B, the interferometer is designed so that the interval between the probe and reference pin mirrors is sufficiently large that no light is blocked by the pin mirrors. Specifically, to prevent the pin mirror(s) from blocking light returning from the test object 20, it can be shown that the following relation should be satisfied:

$$s \geq (\lambda/NA)\xi \quad (2)$$

where s is the required separation of the pin mirror(s) from the focal spot FS, $\xi$ is the highest spatial frequency of the of the complex amplitude of the probe beam wavefront disturbed by the figure error of the test object's surface normalized to the inverse of the radius of clear aperture of the test object's surface, $\lambda$ is the wavelength of the light generated by source 9, and NA is the numerical aperture of the test surface.

Rather than separating the probe and reference pin mirrors by a relatively large interval, however, two or more measurements of the interference pattern generated at the detector's surface can be taken at different lateral separations of the probe and reference pin mirrors to compensate for light blocked by the pin mirrors upon spreading of the probe beam returned from the test object caused by diffraction and surface figure errors of the test object. By using at least two measurements with different lateral separations of the probe and reference pin mirrors, the test object characteristic information lost by light blockage, can be recovered.

To affect movement of the pin mirrors relative to one another for positioning at different lateral separations, the probe and reference pin mirrors are preferably mounted upon respective stages 25, 26 that are controlled to position the probe and reference pin mirrors along the x-axis in FIG. 3B. The test object information carried in the portion of the probe beam blocked by the pin mirrors is recovered by utilizing the fact the complex amplitude distribution of the probe beam at its focus is the Fourier transform of the complex amplitude of the wavefront of the probe beam at the surface of the test object. Due to this fact, the pin mirrors block light in relatively narrow spatial frequency bands of the probe beam wavefront. Therefore, the test object information contained in the light blocked by the pin mirrors can be recovered by taking two measurements with the pin mirrors spaced at different lateral positions along the x-axis in FIG. 3B. Using the two data sets collected from the detector at different separations on the probe and reference pin mirrors, the computer's processor calculates the complex amplitude distributions of the probe beam's wavefronts at the detector surface for the two data sets, performs a Fourier transform of the complex amplitude distributions of the probe beam's wavefront for the two data sets, and fills in the missing spatial frequency bands obtained with the first measurement's data set with those available from the second measurement's data set. Thus, even with significant blockage of the probe beam by the pin mirrors, the probe beam wavefront can be readily determined with the interferometer through data obtained through two measurements.

The sensitivity of each pixel of the detector must be calibrated so that the pixel output is standardized. In other words, in response to a given light intensity at a respective pixel position, each pixel should output substantially the same signal level. As so calibrated, the detector can generate a signal output from which both phase and amplitude distributions of the probe beam's wavefront at the detector's surface can be determined to compensate for light blocked by a pin mirror. There are numerous software packages that can be used by the computer to perform the processing to compensate for light blockage, including Mathematica™ commercially available from Wolfram Research™, Inc. of Champaign, Ill., and Matlab™ commercially available from The Math Works™, of Natick, Mass.

The off-axisness of the invented interferometer causes various aberrations of the probe beam. In most cases, these aberrations are negligible. However, there are interferometer arrangements or applications in which the aberrations, especially astigmatism, are not negligible. Non-negligible aberrations caused by the off-axisness of the invented interferometer can be calculated either analytically or using ray tracing software such as Codev™ available from Optical Research Associates, Inc. of Pasadena, Calif., and subtracted from the data set generated by the detector to null the effect of off-axisness. Therefore, the off-axisness of the interferometer does not limit the invented interferometer's effectiveness or the range of applications to which the interferometer can be applied. Nonetheless, if the following conditions are satisfied, the interferometer will behave as though it had an on-axis configuration so that no probe beam aberrations would occur. To achieve operation as though the interferometer were an on-axis system with respect to astigmatism, the following relation should be satisfied:

$$R/\lambda \geq \lambda \xi^2/4W_{22} \qquad (3)$$

where R is the radius of curvature of the test object's surface, $W_{22}$ is the tolerable amount of astigmatism, and the remaining variables are defined as previously stated.

If an axial separation, in addition to a lateral separation, between the probe and reference pin mirrors and the focal spot of the probe beam returned from the test object's surface exists in the interferometer, there can be spherical aberration and coma, even though negligible for most applications, in addition to astigmatism. The spherical aberration caused by such axial separation between the probe pin mirror and the focal spot of the return probe beam from the test object's surface, is given by the following relation:

$$W_{40}=(d^2/16R)\ NA^4 \qquad (4)$$

where $W_{40}$ is the amount of tolerable spherical aberration, and d is the axial separation between the probe pin mirror and the focal spot of the probe beam returned from the test object's surface, and the remaining variables are as previously stated.

The coma caused by the interferometer's off-axisness is given by the relation:

$$W_{31}=ds\ NA^3/4R. \qquad (5)$$

Under typical circumstances, the spherical aberration $W_{40}$ and coma $W_{31}$ are negligible as to their impact on effective operation of the interferometer. Nonetheless, equations (4) and (5) can be used if it is desired to limit the spherical aberration $W_{40}$ and coma $W_{31}$ to within a specified range.

The surface of the test object is imaged on the surface of the detector by the imaging lens 21. Collimation of both the probe and reference beams at the detector surface using the lens 21 is preferable because it can reduce both critical aberration of wavefronts and image distortion of the test object. During calibration of the interferometer prior to performing test object characteristic measurements, the relative wavefront aberration between probe and reference beams caused by the imaging lens 21 can be measured using the probe pin mirror positioned, preferably with its stage 25, so as to be turned around to face the same direction as the reference pin mirror. With the probe pin mirror thus positioned, during calibration of the interferometer prior to taking measurements of test object characteristic(s), the computer reads and stores the relative wavefront aberration in the computer's memory. The calibration does not involve any reference surface, therefore, this calibration is accurate in an absolute sense. When taking test object characteristic measurements, the computer subtracts the relative wavefront aberration from the test object measurement data to eliminate errors due to such relative aberration.

The interferometer of FIGS. 4A and 4B is similar to that of FIGS. 3A and 3B, except that the fringe contrast is controlled through relative polarization of the probe and reference beams. In the interferometer of FIGS. 4A and 4B, the attenuator 17 of FIG. 3A is not used. Rather, the interferometer of FIGS. 4A and 4B includes a polarization rotator 27, quarter-wave plates 28, 29 and polarizer 30 that are used to achieve polarization effects to control fringe contrast. Also, the beam splitter 14 of FIG. 4A has an interface that reflects or transmits light depending upon its polarization. The polarization rotator 27 is situated between the attenuator 10 and the positive lens 11, and controls the polarization of the light from source 9 along two orthogonal directions in the x-y plane. After expansion and filtration through lenses 13, 11 and filter 12, the beam from lens 13 travels to beam splitter 14. Light polarized in the x-axis direction reflects from the beam splitter's interface as the probe beam and travels to and reflects from the mirror 15, passing twice through the quarter-wavelength plate 28 situated between the beam splitter 14 and the mirror 15. Therefore, upon return to the beam splitter, the probe beam is polarized in the y-axis direction so that the probe beam passes through the beam splitter's interface to the polarizer 30. On the other hand, light incident to the input side of the beam splitter 14 that is polarized in the y-axis direction passes through the beam splitter's interface as the reference beam that travels to and is reflected by the mirror 16 to return to the beam splitter's interface after twice passing through the quarter-wave plate 29 situated between the beam splitter and the mirror 16. The quarter-wave plate 29 rotates the polarization of the reference beam by a total of 90° upon passing twice through the plate. Accordingly, the reference beam returns to the beam splitter's interface polarized in the x-axis direction and so reflects from the beam splitter's interface to the polarizer 30. The polarizer 30 allows the light polarization component along its axis to pass through the polarizer, but absorbs or reflects the light polarization component perpendicular to its polarization axis. Thus, because the probe and reference beams are polarized in orthogonal directions, the polarizer 30 can be rotated to a desired angular position to control the relative intensity of the probe and reference beams, and hence, the fringe contrast of the interference pattern generated with the probe and reference beams.

A third embodiment of the invented interferometer is shown in FIGS. 5A and 5B. The interferometer is virtually identical to that of FIGS. 3A and 3B with the omission of the imaging lens 21. In the interferometer of FIGS. 3A and 3B, the imaging lens 21 is provided to form the image of the test object on the detector surface. The imaging lens 21 allows the detector 22 to generate a signal in a form that can be processed by the computer using one of a wide variety of commercially-available software packages from sources such as Phase Shift Technology™, Inc. or Wyko™ Corporation, both of Tuscon, Ariz., or Zygo™ Corporation of Middlefield, Conn. However, in the interferometer of FIGS. 5A and 5B, the imaging lens 21 is omitted in order to completely eliminate the aberration, distortion, surface reflections and scattering of light caused by the lens 21. In the interferometer of FIGS. 5A and 5B, the test object's surface figure characteristic is extracted in the following way. For test objects with surfaces with relatively low NA, the computer can be programmed to trace the wavefront of the probe beam backward to the test object's surface using the complex amplitude data measured at the detector's surface, and the well-known scalar diffraction equation. The complex amplitude data are measured by determining the intensity and phase of the probe beam at the detector's surface. On the other hand, for test object surfaces with moderate or relatively high NA, the complex amplitude and direction of the electric field of the probe beam should be determined at each point on the detector's surface, and the computer should be programmed to perform vector backward diffraction on each component of the electric field separately. The complex amplitude and direction of the electric field of the probe beam at the detector's surface can be readily determined from basic optics theory because the shape of the wavefront is relatively simple, i.e., spherical or nearly so. Preferably, the complex amplitude and direction of the electric field of the probe beam at the detector's surface are programmed into the computer for use in determining the test object's characteristic(s). Alternatively, the complex amplitude and direction of the electric field of the probe beam at the detector's surface can be determined using a rotatable polarizer situated in front of the detector if wavefront aberrations and distortion caused by the polarizer can be determined so that data generated by the detector can be compensated for such aberrations or distortion, preferably by appropriately programming the computer.

The third embodiment of the interferometer of FIGS. 5A and 5B is especially useful with light of wavelengths for which an imaging lens or mirror cannot be manufactured, or for which such lens or mirror can only be manufactured with great difficulty, due to strong absorption or excessive scattering of the light by such lens or mirror material. For example, all known materials (e.g., glasses, crystals, plastics, polymers, liquid, etc.) from which lenses can be made are opaque to extreme ultraviolet light, and mirrors exhibiting low amounts of scattering are extremely difficult to manufacture for light in the extreme ultraviolet spectrum. Therefore, the elimination of the imaging lens is highly preferred, and may be necessary, for operation of the interferometer for light in some wavelength ranges such as extreme ultraviolet.

Figures 6A, 6B:
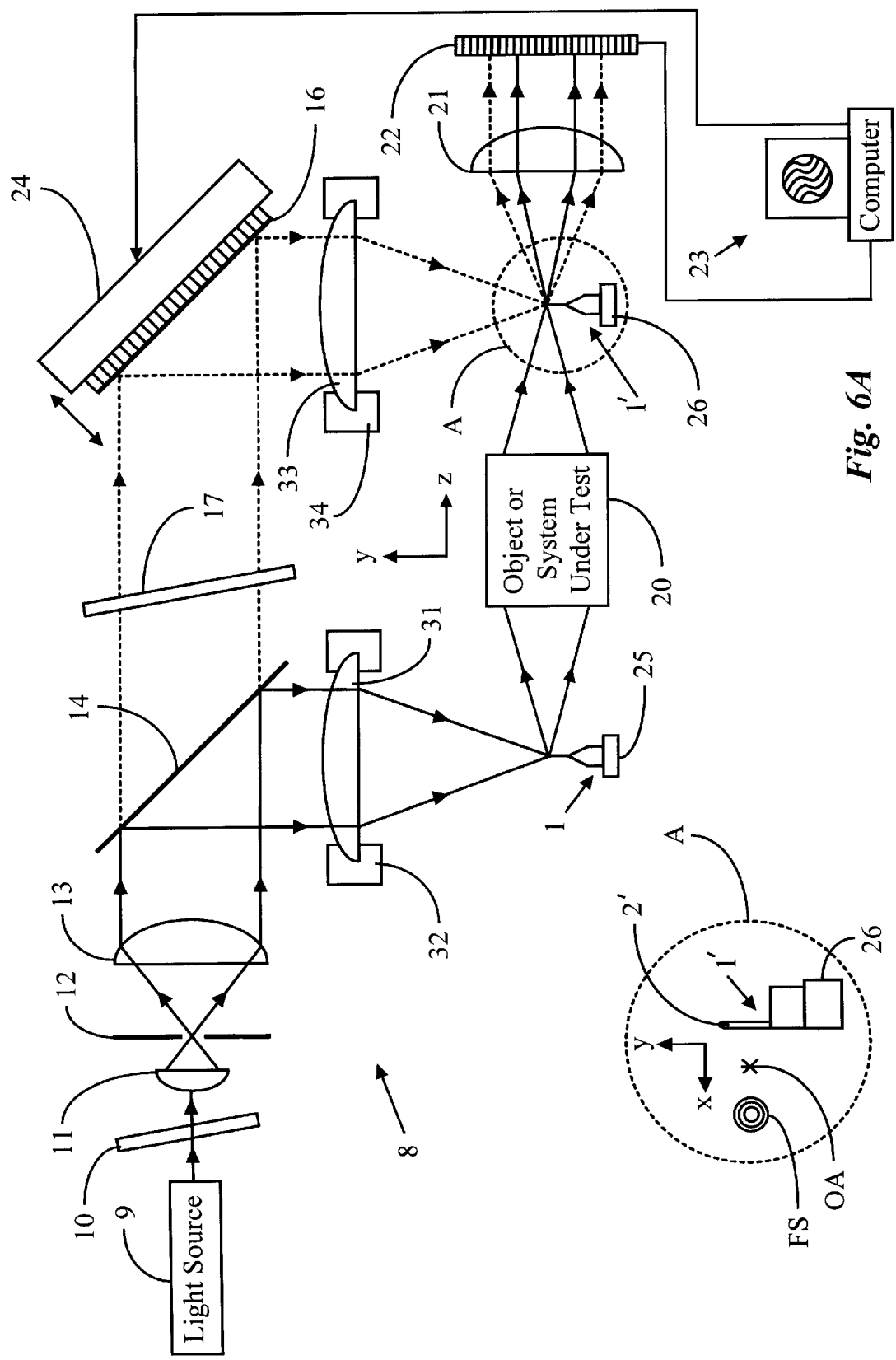
FIGS. 6A and 6B are views of a fourth embodiment of the interferometer for use with a transmissive test object or system.

The interferometer of FIGS. 6A and 6B is useful for testing transmission characteristics of a test object or a system that includes a plurality of test objects. The interferometer of FIGS. 6A and 6B is preferred for use with a test object or system that outputs convergent light generated from the divergent light that is incident to the object or system. The elements included in the interferometer of FIGS. 6A and 6B are described below. Light is generated by source 9 and is expanded and filtered by lenses 11, 13 and filter 12 that are arranged to receive the light from the source 9. Light from collimating lens 13 is received by the input side of a beam splitter 14. Light reflected from the beam splitter's interface travels as the probe beam to focusing lens 31. The lens 31 focuses the probe beam onto the probe pin mirror 1. A stage 32 can be used to move the lens 31 toward or away from the probe pin mirror, to adjust the focus of the light supplied to the probe pin mirror 1. The probe pin mirror diffracts and reflects the probe beam in a direction toward the test object or system 20. The probe beam travels through the test object or system 20 and is disturbed in a manner that is indicative of one or more characteristics of the object or system under test. From the test object or system 20, the probe beam travels to a focal spot FS of the test object or system that is located in the same x-y plane as the reference pin mirror's reflective surface 2'.

At the beam splitter 14, a portion of the input light from the light source 9 passes through the beam splitter as the reference beam to the attenuator 17. The attenuator 17 reduces the intensity of the reference beam, preferably to a degree that can be adjusted, to obtain a desired fringe contrast in the interference pattern generated with the probe and reference beams in the interferometer of FIGS. 6A and 6B. From the attenuator, the reference beam travels to and reflects from mirror 16 that is angled in FIG. 6A about an axis parallel to the x-axis. The reference beam reflected from mirror 16 travels to focusing lens 33 that focuses the reference beam onto the reference pin mirror 1'. To adjust the focus of the lens 33, a stage 34 can be used to move the lens toward or away from the reference pin mirror. The reference pin mirror diffracts and reflects the reference beam to the imaging lens 18 and detector 22 to generate the interference pattern. The detector 22, the computer 23 and the actuator 24 are structured, coupled and function substantially as previously described with respect to the interferometer of FIGS. 3A and 3B.

The probe pin mirror in the interferometer of FIGS. 6A and 6B is not located in proximity to the reference pin mirror. Therefore, the probe pin mirror can be replaced with a pinhole or a single mode optic fiber. Such replacement neither improves nor degrades the performance of the interferometer, but can be used to achieve a reduction in size or reduced expense for the packaging of the interferometer. Also, one or more of the air paths traveled by the probe and reference beams can be replaced with optic fibers, preferably single mode, to achieve bending of such light paths and hence flexibility in the arrangement of the interferometer's elements. The interferometer of FIG. 6C has an exemplary configuration with an optic fiber to guide light from the source to the beam splitter, and also includes optic fibers used to guide the probe and reference beams generated by the beam splitter, to respective emission points. More specifically, the interferometer 8 of FIG. 6C includes the light source 9, preferably a laser, that generates light supplied to the attenuator 10. The attenuated light travels to the focusing lens 11 that focuses the light upon an input end of optic fiber 42. The light travels the length of the optic fiber 42 and is emitted to the collimating lens 13. The collimated light output from the lens 13 passes to an input side of the beam splitter 14. A portion of the light reflects from the beam splitter's interface as the probe beam, travels to and reflects from the mirror 15, and passes through the beam splitter to the lens 31. The position of lens 31 is controlled by the stage 32 so that the light traveling through the lens 31 is focused at an input end of the optic fiber 43. The probe beam travels the length of the fiber 43 and is diffracted upon emission from the output end of the fiber. The probe beam travels through the test object or system 20 and is disturbed according to its characteristics. The test object or system 20 is such that it focuses the probe beam at a focal spot immediately adjacent the reference pin mirror 1'. A portion of the light traveling to the beam splitter 14 passes through the beam splitter's interface as the reference beam, and is attenuated by the attenuator 17 to a controllable degree to set the fringe contrast. The light passes from the attenuator 17 to the lens 33 mounted on the stage 34 that can be controlled to set the position of the lens 33 so that it focuses the light passing through it onto the input end of optic fiber 44. From the output end of the fiber 44, the light is emitted to a lens 45 whose position is controlled with a stage 46 in which the lens 45 is mounted. By proper positioning of the lens 45 with the stage 46, the light passing through the beam is focused onto the reflective surface 2' of the reference pin mirror 1'. The reference beam is diffracted and directed in substantially the same direction traveled by the probe beam, to the imaging lens 21 that focuses the probe and reference beams onto the surface of the detector 22 to generate an interference pattern on the detector's surface. The detector 22 is coupled to the computer 23 that is in turn coupled to the actuator 24. The reference pin mirror diffracts and reflects the reference beam to the imaging lens 21 and detector 22 to generate the interference pattern. The detector 22, the computer 23 and the actuator 24 are structured, coupled and function as previously described with respect to the interferometer of FIGS. 3A and 3B, and use commercially-available software package(s) to determine test object or system characteristics of interest such as surface figure, field curvature, magnification, distortion, aberration, etc.

Figure 6C:
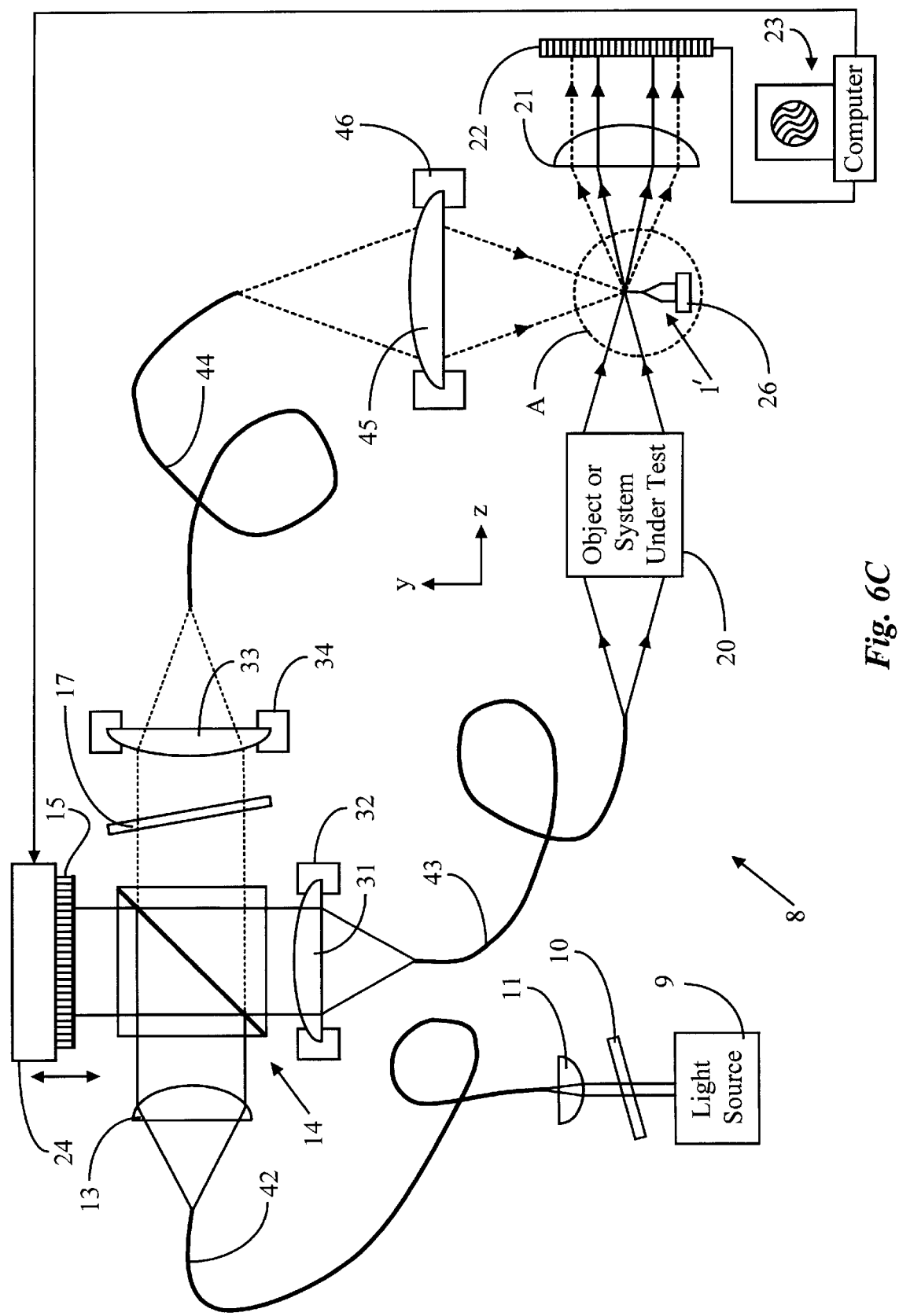
FIG. 6C is a view of a fifth embodiment of the interferometer for use with a transmissive test object or system.

The interferometers of FIGS. 6A, 6B and 6C can be adapted for measurement of various important test object or system characteristics such as field curvature, magnification and distortion which are directly related to the locations of image points relative to the locations of corresponding object points. In this adaptation, the probe and reference pin mirrors 1, 1' can be mounted on respective precision stages capable of indicating the pin mirror location. Measurement of the object or system characteristics can be enhanced by measurements using probe beams of different numerical apertures. Therefore, an array of probe pin mirrors (not shown in FIGS. 6A and 6B, but shown in FIG. 7A), each having a different numerical aperture determined by the size of its reflective surface, can be used to provide probe beams of different numerical aperture for analysis of the test object or system. In addition, the wavelength of the light source 9 can be variable to provide the capability to measure chromatic aberrations. All of these characteristics of the test object or system, by respective definitions, can be easily calculated by determining the positions of the probe and reference pin mirrors, preferably output as a display or signal from their stages, and converting the tilt information of the probe wavefront relative to the reference wavefront from the interferometer display screen into the relative distance between the image point and the reference pin mirror (preferably, the computer is programmed to perform these functions). The relative wavefront tilt of the probe and reference beams is equal to the lateral separation of the reference pin mirror and the focal spot of the probe beam, divided by the focal length of the imaging lens.

Figure 7B:
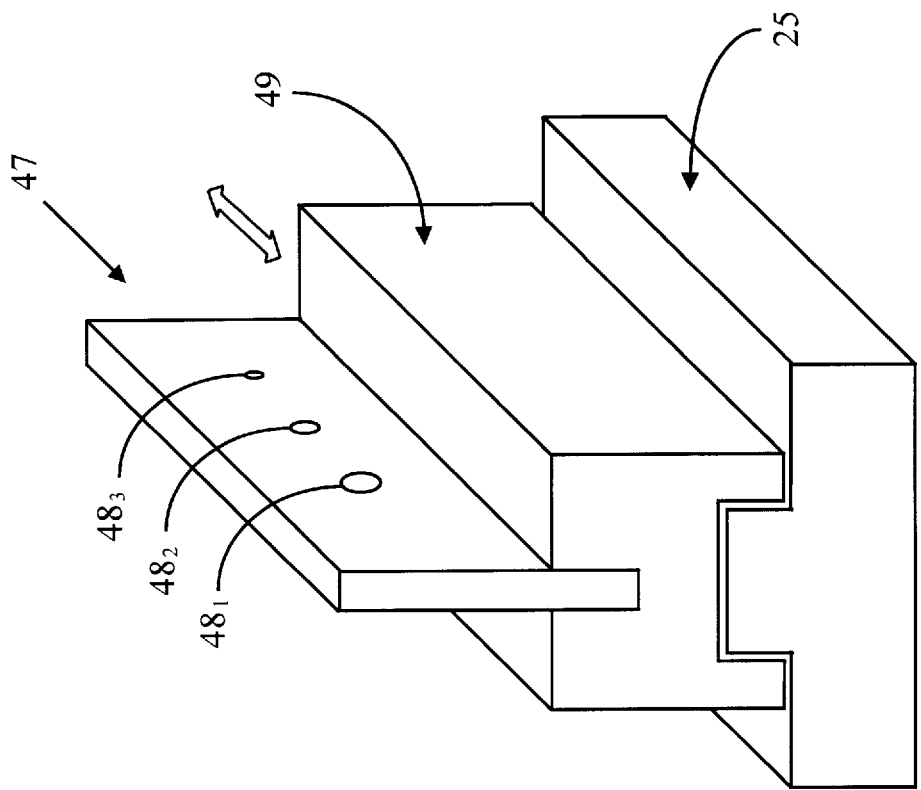
FIG. 7B is a perspective view of a stage with a member defining an array of pinholes.
Figure 7A:
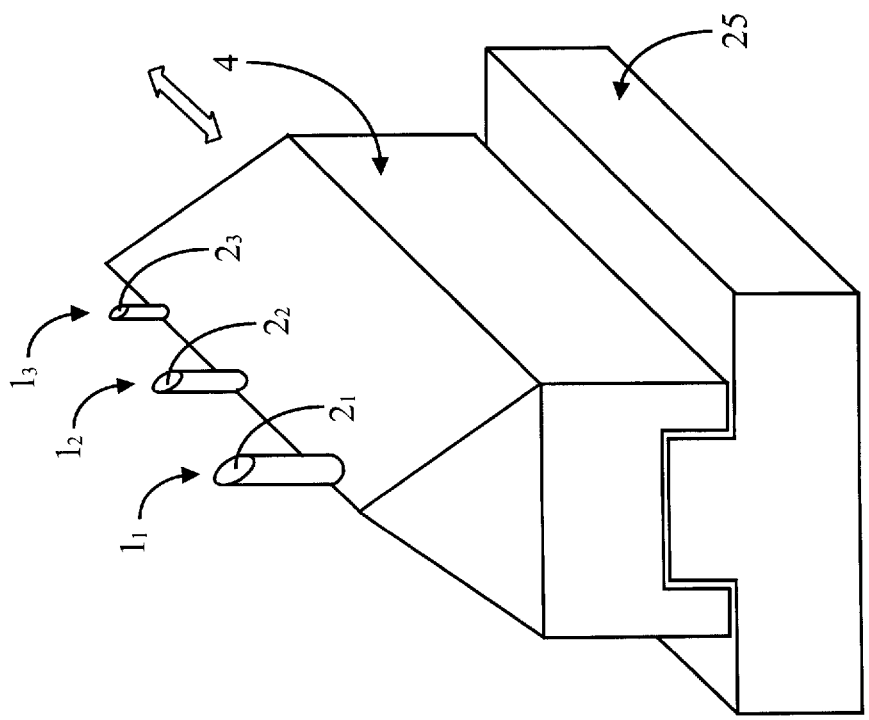
FIG. 7A is a perspective view of a stage with an array of probe pin mirrors.

FIG. 7A shows a possible implementation of an array of probe pin mirrors used to achieve the capability to test the object or system with probe beams of different numerical apertures. More specifically, in FIG. 7A, three probe pin mirrors have respective ends mounted to a base 4 that is mounted to a stage. Each probe pin mirror has a reflective surface of different size and hence numerical aperture. The position of stage 25 can be adjusted along the x-axis to move the reflective surface 2 of a selected pin mirror to receive the light from the focusing lens 31 of FIG. 6A. By using the different probe pin mirrors to receive the light from the lens 31, the computer can read and store interference patterns generated with probe beams of different numerical aperture. Preferably, the computer is coupled to control the stage to successively move each of the pin mirrors in the array to the focal point of the lens 31, to automate the test object or system measurement process.

The array of pin mirrors of FIG. 7A can be replaced with a plate member 47 defining an array of differently-sized pinholes $48_1$, $48_2$, $48_3$ as shown in FIG. 7B. The plate member 47 is fixed in a mount 49 that rides on the stage 25. The stage 25 allows the mount 49 and the plate member 47 to be moved along the x-axis direction so that a selected pinhole $48_1$, $48_2$, $48_3$ can be moved into the path of the probe beam between the beam splitter and the test object or system. The probe beam can thus be generated with a numerical aperture corresponding to the size of the selected pinhole. The computer can read and store interference patterns generated with probe beams of different numerical aperture generated by respective pinholes. Preferably, the computer is coupled to control the stage to successively move each of the pinholes in the array defined by the plate member 47 to the focal point of the lens 31, to automate the test object or system measurement process.

Figures 8A, 8B:
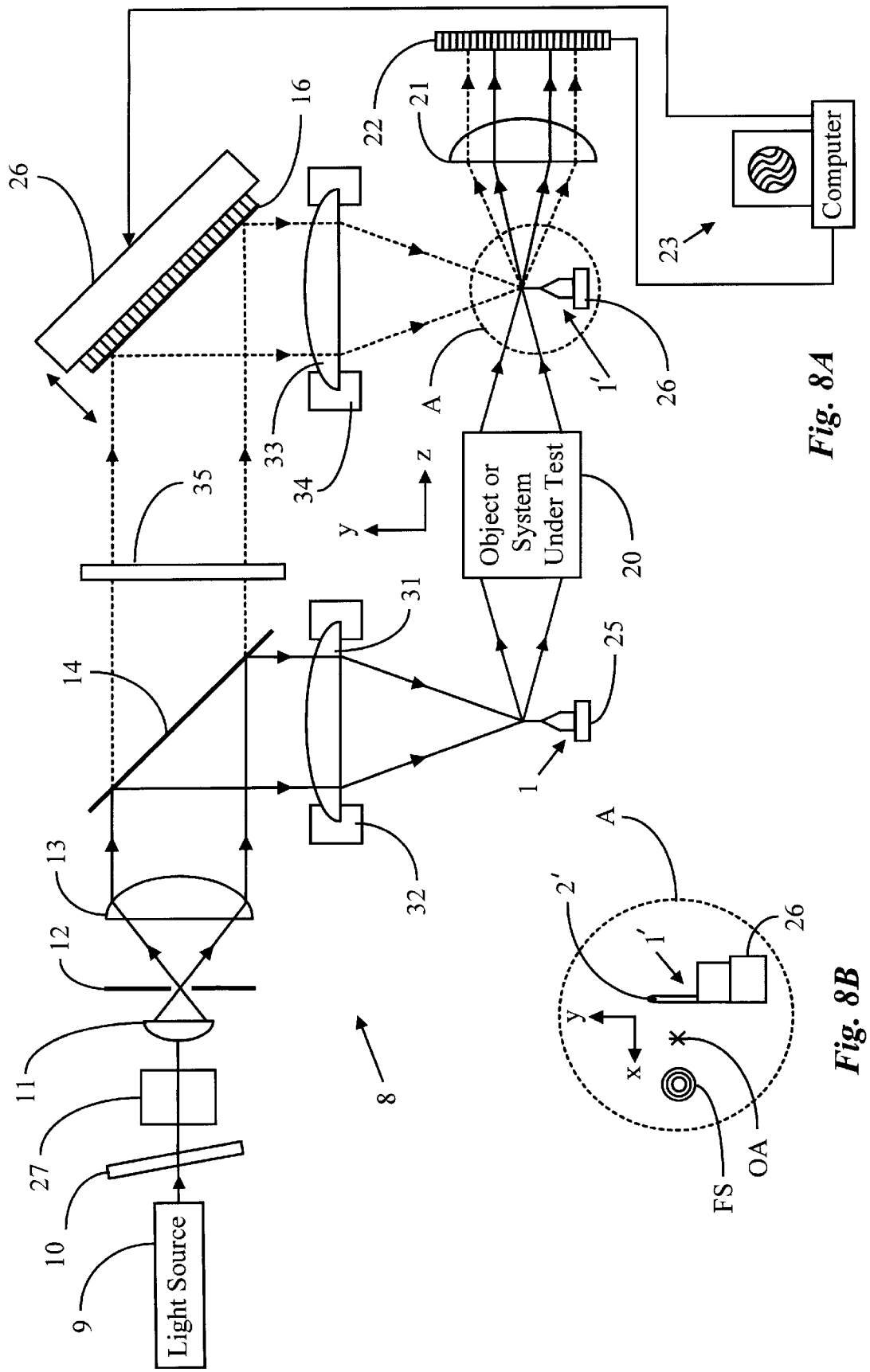
FIGS. 8A and 8B are views of a sixth embodiment of the interferometer for use with a transmissive test object or system.

The sixth embodiment of the interferometer is shown in FIGS. 8A and 8B. The interferometer of FIGS. 8A and 8B is similar in many respects to that of FIGS. 6A and 6B, but uses polarization to accomplish beam splitting and fringe contrast of its interference pattern. More specifically, the interferometer includes the following elements arranged as shown in FIGS. 8A and 8B. Between the attenuator 10 and the lens 13, the polarization rotator 27 (which is the same element as previously described with respect to FIGS. 4A and 4B) polarizes the light from source 9 in two orthogonal directions. The beam splitter 14 has an interface that reflects light of one polarization to form the probe beam, but passes light of the opposite polarization to form the reference beam. The reference beam travels to half-wave polarization plate 35 that rotates the reference beam's polarization by $\pi/2$ so that the probe and reference beams have the same polarization and hence will interfere when propagated together. The remainder of the interferometer of FIGS. 8A and 8B is similar in structure and function to that of FIGS. 6A and 6B, and can include precision stages to control the position of respective pin and reference probe pin mirrors, and/or an array of probe pin mirrors or pin holes, that can be used to generate probe beams of different numerical apertures to measure the characteristics of the test object or system.

Figure 9:
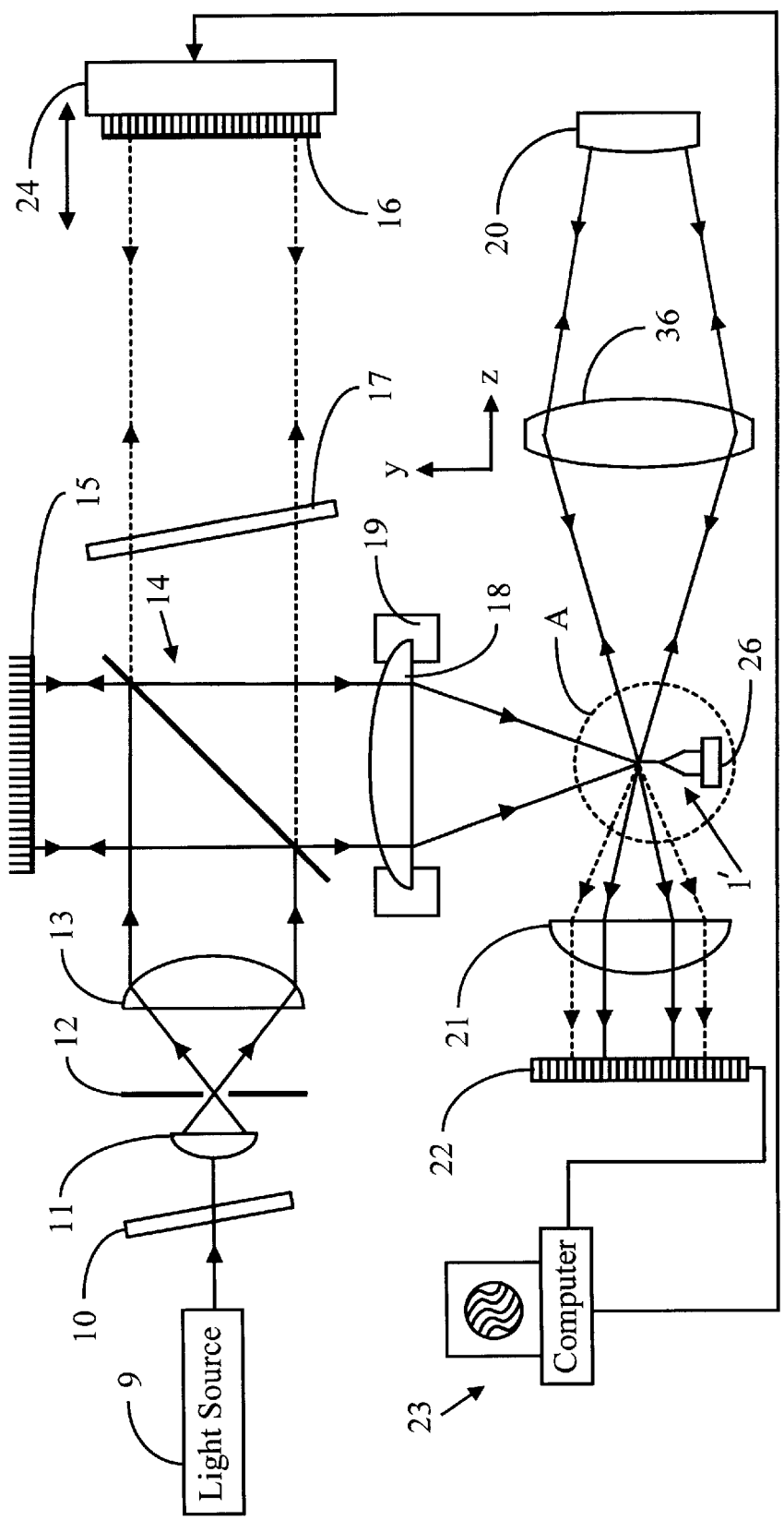
FIG. 9 is a view of a seventh embodiment of the interferometer for use with a test object with a convex surface.

The interferometer of FIG. 9 is similar in structure and function to that of FIGS. 3A and 3B, but is adapted for use with a test object 20 that has a convex surface through the inclusion in the interferometer of converging lens 36 arranged between the probe pin mirror 1 and the test object. The lens 36 is arranged to receive the divergent light from the probe pin mirror, and converges the probe beam onto the test object 20. The probe beam reflects from the object 20, and returns to the lens 36 that focuses the returning probe beam at a focal spot in the x-y plane containing the reflective surface of the reference pin mirror, an arrangement similar to that of FIG. 3B. The probe and reference beams travel to the lens 18 and the detector 22 to generate the interference pattern, as previously described with respect to FIGS. 3A and 3B, for example. Importantly, the aberration of the converging lens 36 must be determined using the embodiment of FIGS. 6A, 6B, 6C or 8A, 8B, and stored in the computer's memory for subtraction from the signal generated by the detector based on the interference pattern so that measurements of the test object's figure error or other characteristic will not be affected by aberrations introduced by the lens 36.

Figure 10:
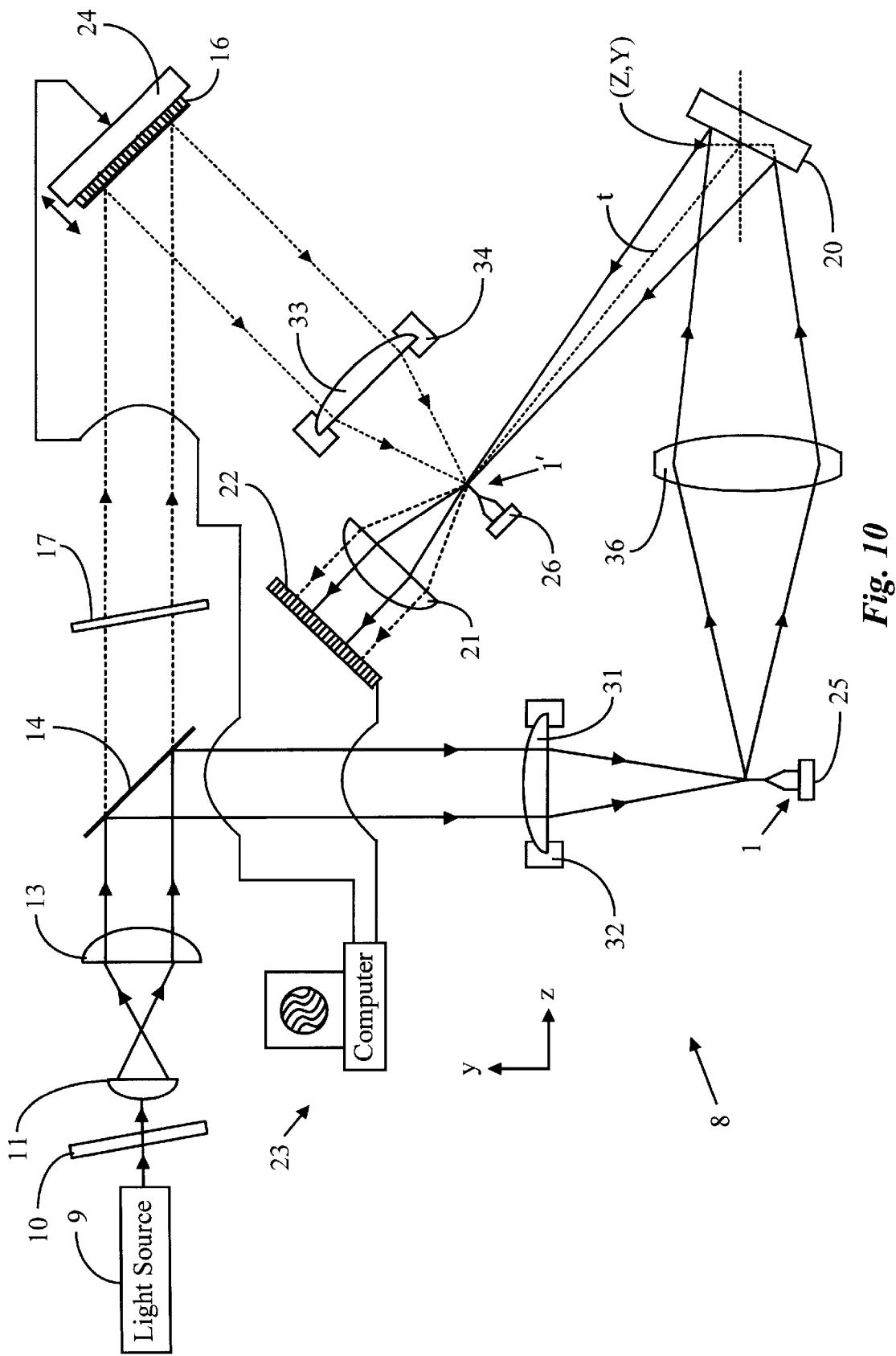
FIG. 10 is a view of a eighth embodiment of the interferometer for use with a test object with a flat surface.

The interferometer of FIG. 10 can be used to measure a surface figure or surface figure error characteristic of a test object that has a flat surface using a converging probe beam. As used herein, 'surface figure error' is a measure of an object's departure from a true object shape. Therefore, in the interferometer of FIG. 10, the surface figure error characteristic of interest is the relative error of the test object's surface compared to a true flat surface.

In the interferometer of FIG. 10, the aberrations caused by the presence of the converging lens 33 are detected by the detector 22 using the embodiment of FIGS. 6A, 6B, 6C or 8A, 8B and stored in the computer's memory for use by the computer's processor to compensate measurements of the test object's characteristics for the lens' aberrations. In addition, the variation of the incidence angles of rays across the surface of the test object requires a collinear coordinate transformation between the ray coordinate on the surface of the test object and a corresponding coordinate on the surface of the detector. The transformation equations are:

$$\frac{1}{x_s} = \left(1 - \frac{y \tan(\alpha)}{t}\right) \frac{1}{x} \quad (6)$$

$$\frac{1}{y_s} = \frac{\cos(\alpha)}{y} - \frac{\sin(\alpha)}{t} \quad (7)$$

where (x, y) are the Cartesian coordinates of a ray in the plane that is parallel to the detector surface (or perpendicular to the optical axis) and intersects the surface of the test object at the origin, and the $(x_s, y_s)$ are the Cartesian coordinates of the same ray on the surface of the test object, and $\alpha$ is the tilt angle of the test object about the x-axis, relative to the y-axis. Due to the variation of the incidence angles of the rays across the surface of the test object, the surface figure error of the test object is not linearly proportional to the wavefront disturbance error of the probe beam, rather, they have the following relationship:

$$g(x_s, y_s) = \frac{\sqrt{x_s^2 + y_s^2 + t^2 + 2ty_s \sin(\alpha)}}{2t \cos(\alpha)} W(x_s, y_s) \quad (8)$$

where $g(x_s, y_s)$ is the test object's surface figure error characteristic, $\alpha$ is the tilt angle of the test object's surface, and $W(x_s, y_s)$ is the measured wavefront disturbance or error due to the test surface figure error after compensation for the aberrations introduced by lens 33. Therefore, by determining $W(x_s, y_s)$ based on the signal from detector 22, the computer 23 can be programmed to generate and display the test object's surface figure error $g(x_s, y_s)$ using relation (8).

Figure 11:
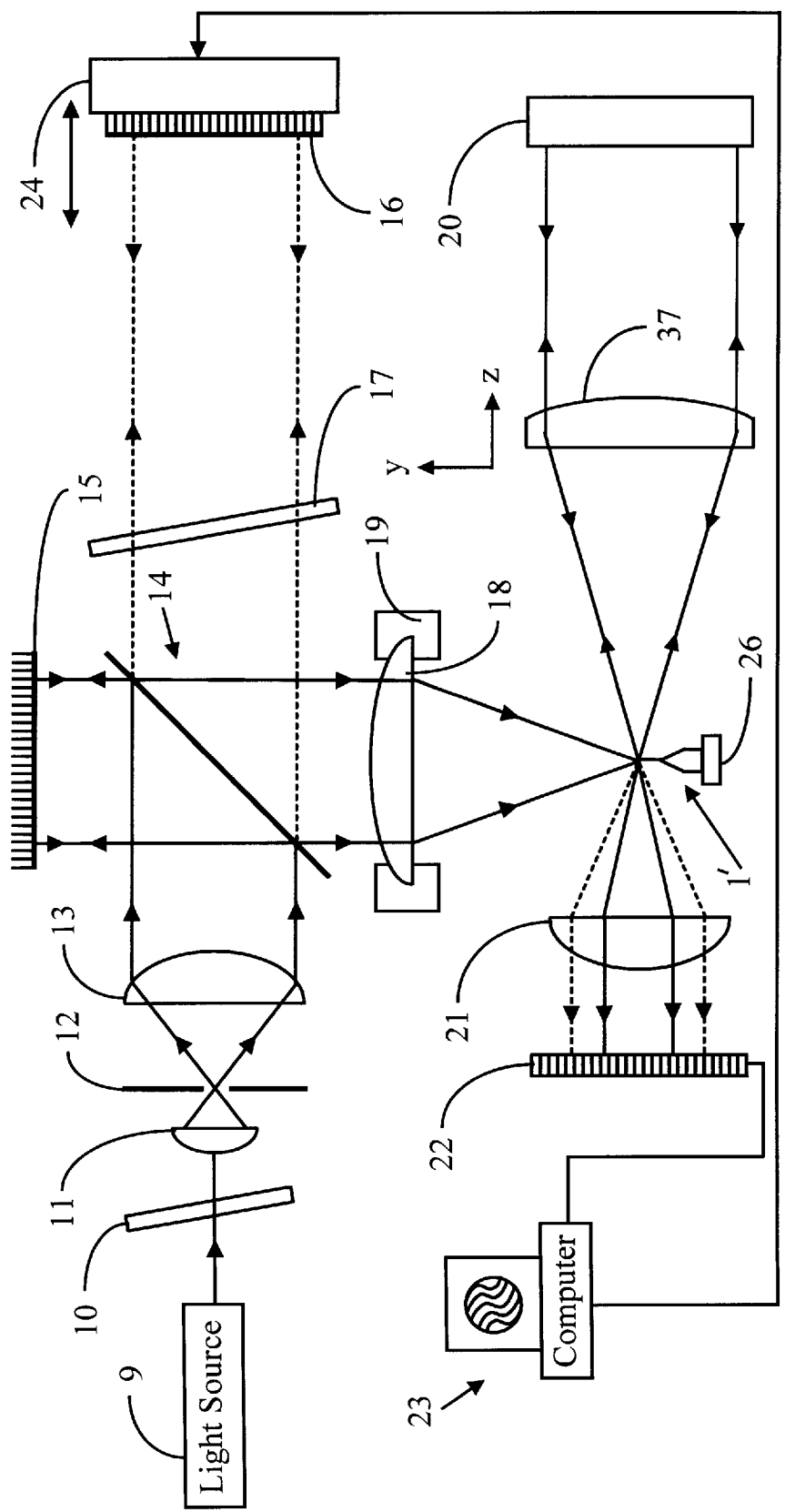
FIG. 11 is a view of an ninth embodiment of the interferometer for use with a test object with a flat surface.

The interferometer of FIG. 11 is structured and functions similarly to the interferometer of FIGS. 3A and 3B, but is adapted for use in analyzing a test object 20 with a flat surface. More specifically, the interferometer includes a collimating lens 37 arranged so that its focal point coincides with the probe pin mirror's reflective surface. The lens 37 collimates the probe beam from the probe pin mirror 1 and directs the probe beam to the test object's surface. The probe beam reflects from the test object and travels to the collimating lens that focuses the return probe beam on the x-y plane that includes the reference pin mirror's reflective surface. The probe and reference beams travel together through the imaging lens 21 and generate an interference pattern at the surface of the detector 22. As with the interferometer of FIGS. 3A and 3B, the interferometer of FIG. 11 includes the detector 22 that generates an electric signal, based on the interference pattern, and is coupled to supply the signal to the computer 23. The computer 23 is programmed to compensate the signal from the detector for aberrations in the lens 37 so that the measurements of the test object's surface figure characteristic will not be affected by the lens' aberrations. In other respects, the structure and operation of the interferometer of FIG. 11 is similar to that of FIGS. 3A and 3B.

Figure 12:
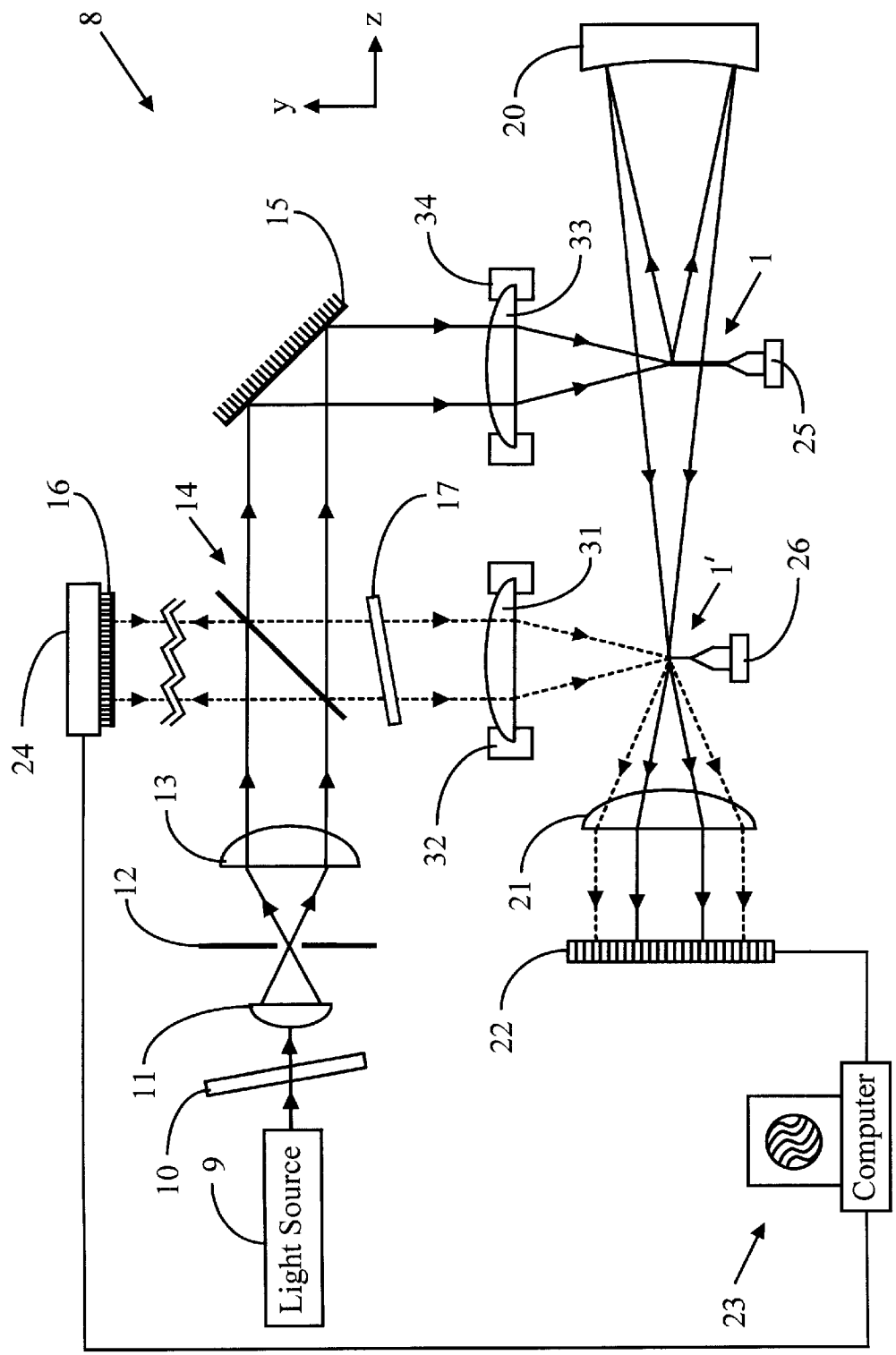
FIG. 12 is a view of a tenth embodiment of the interferometer for use with a test object with a concave elliptical surface.

The interferometer of FIG. 12 can be used to measure surface figure error characteristic in a test object 20 that has an elliptical surface that, by definition, has two foci. The interferometer of FIG. 12 includes the following elements arranged as shown in FIG. 12. In FIG. 12, the light source 9, attenuator 10, filter 12 and lenses 11, 13 are structured and function similarly to corresponding elements in FIGS. 3A and 3B, for example. A portion of the light from the light source 9 travels to the input side of the beam splitter 14 and travels through the beam splitter's interface as the probe beam. From the beam splitter, the probe beam travels to the mirror 15. The mirror 15 is angled with respect to the direction of incidence of the probe beam from the beam splitter, so that the probe beam is reflected from the mirror 15 and travels to the focusing lens 33 that focuses the probe beam onto the probe pin mirror's reflective surface. The position of lens 33 can be adjusted by the stage 34 to focus the probe beam onto the pin mirror The probe pin mirror is located at the test object focus that is closer to the test object. The probe pin mirror diffracts and reflects the probe beam to the test object 20 whose surface disturbs the phase of the spherical wavefront of the probe beam according to its surface figure. The reflected probe beam travels to the other test object focal spot determined by the shape of the test object, that is in an x-y plane common to that of the reference pin mirror's reflective surface. Because the probe pin is located at one of the foci of the elliptical surface, no wavefront aberration occurs except for those aberrations caused by the test object surface's departure from a true ellipse. From its focal spot, the return probe beam travels to the lens 21 that directs the probe beam to the detector 22. A portion of the light incident to the beam splitter 14 from the light source 9 reflects from the beam splitter's interface and travels as the reference beam to the mirror 16 which is arranged to oppose a side of the beam splitter. The reference beam reflects from the mirror 16 and passes through the beam splitter to the attenuator 17 arranged on the opposite side of the beam splitter relative to that of the mirror 16. The attenuator 17 attenuates, preferably to an adjustable degree, the reference beam to obtain a desired fringe contrast. From the attenuator 17, the reference beam travels to focusing lens 31 whose axial position can be adjusted with the stage 32 to focus the reference beam onto the reflective surface of the reference pin mirror 1. The reference pin mirror diffracts and reflects the reference beam through the lens 21 to the detector 22. The reference beam interferes with the probe beam to generate an interference pattern at the detector's surface. The structure and operation of the detector 22 and the computer 23 are similar to those previously described with respect to FIGS. 3A and 3B.

The interferometer of FIG. 12 is subject to error generated due to the presence of the probe pin mirror 1 in the path of the return probe beam from the test object 20. The probe and reference pin mirrors are significantly separated from one another along the optical axis of the interferometer. Therefore, the probe pin mirror will create a relatively small linear shadow on the detector surface. The probe pin mirror's shadow will be localized on the detector surface, and will not cause significant measurement error, but will cause the loss of data at the shadowed region of the detector's surface. However, the missing measurement data due to the shadow of the probe pin mirror can be completely recovered by taking another measurement with the probe pin mirror or the test object at a different angular orientation.

Figure 13:
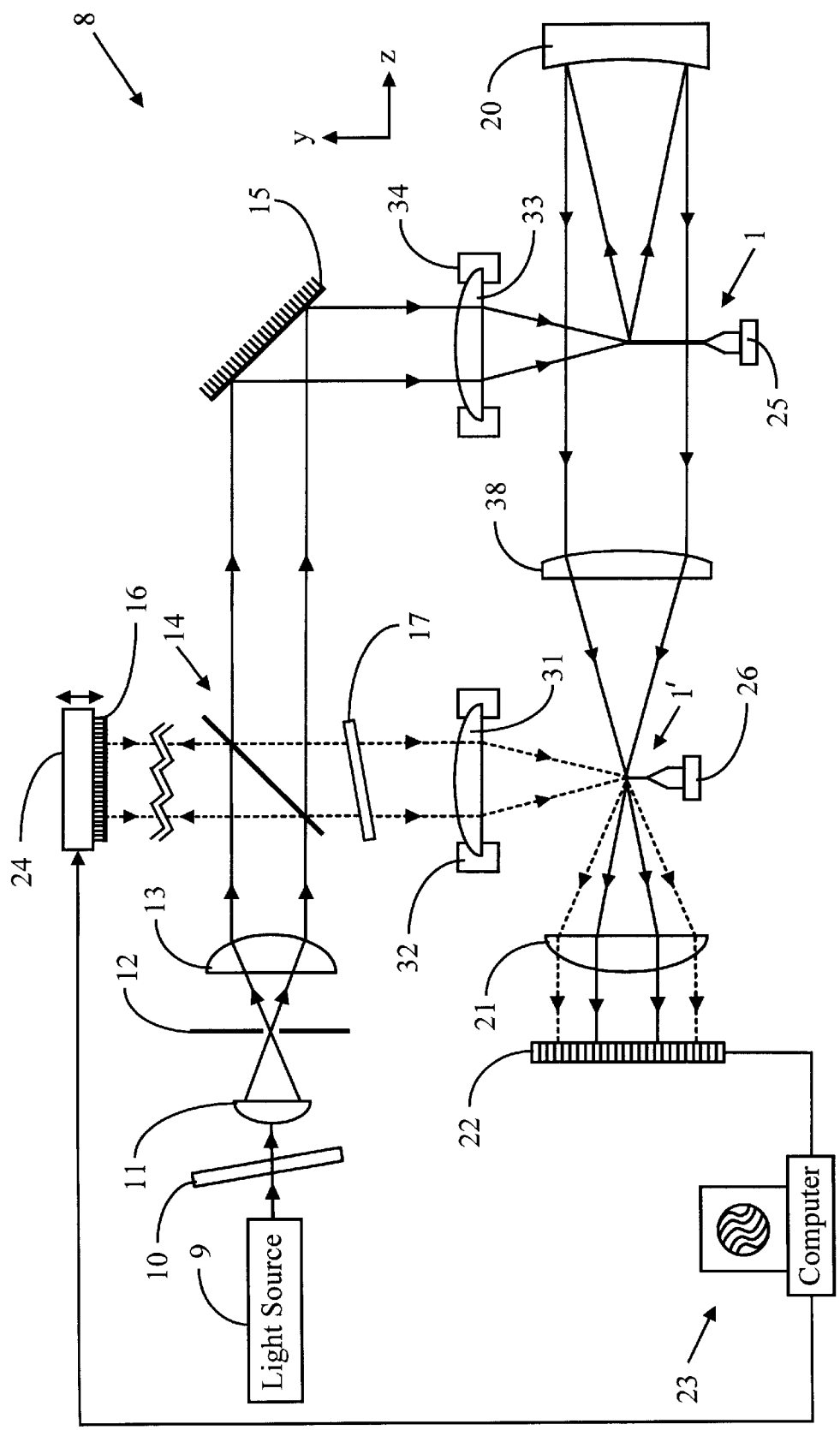
FIG. 13 is a view of a eleventh embodiment of the interferometer for use with a concave parabolic surface.

The interferometer of FIG. 13 is configured for measurement of surface figure or surface figure error characteristic of a test object 20 with a parabolic surface. The interferometer of FIG. 13 is similar in structure and operation to that of FIG. 12, but includes a converging lens 38 arranged to receive the return probe beam from the test object. The probe pin mirror 1 is located at the focal point of the test object's parabolic surface, and accordingly, the return probe beam is collimated. The lens 38 focuses the return probe beam at a focal spot in the same x-y plane as the reflective surface of the reference pin mirror 1'. The return probe beam and the reference beam pass through the lens 21 and generate an interference pattern indicative of the parabolic contour of the test object so that figure errors can be detected in the test object's surface. The structure and operation of the detector 22 and the computer 23 are similar to those previously described with respect to FIGS. 3A and 3B. As described with respect to the interferometer of FIG. 12, by taking more than one measurement with the probe pin mirror and/or test object disposed at different angular orientations, the test object's surface figure characteristic can be compensated by the computer for the loss of a portion of the return probe beam blocked by the presence of the probe pin mirror in the path traveled by the return probe beam.

Figure 14:
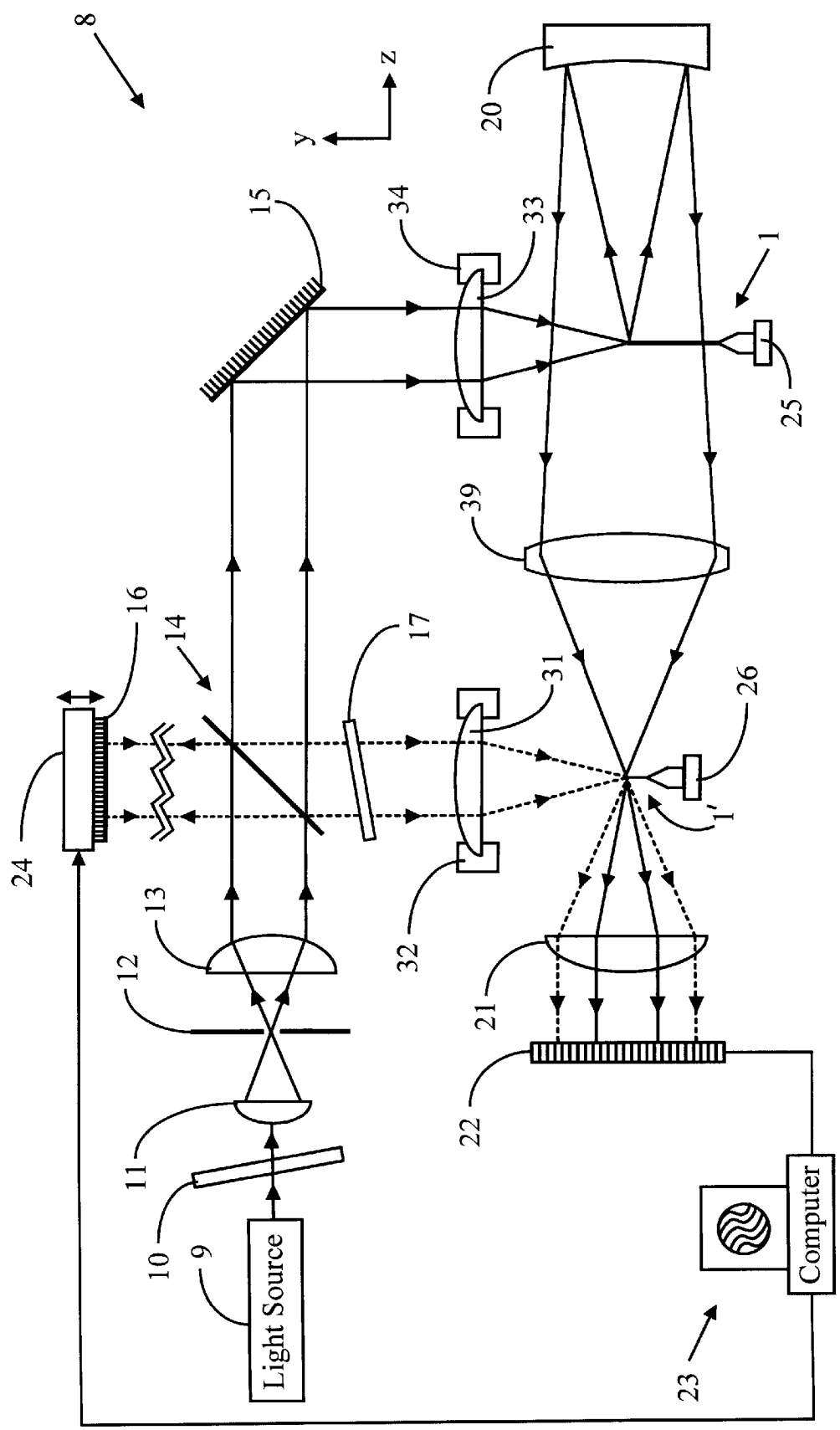
FIG. 14 is a view of an twelfth embodiment of the interferometer for use with a concave hyperbolic surface.

The interferometer of FIG. 14 is adapted to measure surface figure error of a test object with a hyperbolic concave surface which, by definition, has two foci, one on each side of the surface. The interferometer of FIG. 14 is similar to the interferometer of FIG. 12, but includes a converging lens 39 arranged between the test object 20 and the reference mirror pin 1'. In order to avoid the wavefront aberration caused by the hyperbolic shape of the surface, the probe pin mirror 1 is located at the front focus of the test object, and the converging lens forms the image of the backside focus of the hyperbolic surface at a position relatively close to the reference pin mirror 1. The probe pin mirror 1 directs the probe beam to the concave surface of the test object 20. The probe beam reflected from the test object's surface passes through the converging lens 39 that focuses the probe beam at a focal spot near the reflective surface of the reference pin mirror. The remaining structure and function of the interferometer of FIG. 14 are similar to those described with respect to FIGS. 3A, 3B and 11, for example. As with the interferometer described with reference to FIG. 12, the missing measurement data due to the presence of the probe pin in the return probe beam's path can be fully recovered by taking another measurement with either the probe pin or the test object positioned at a different angular position relative to that at which the first measurement data was obtained. The data recovery is accomplished by supplementing the data of one of the measurements with the data that such measurement is missing, from at least one additional measurement.

Figure 15:
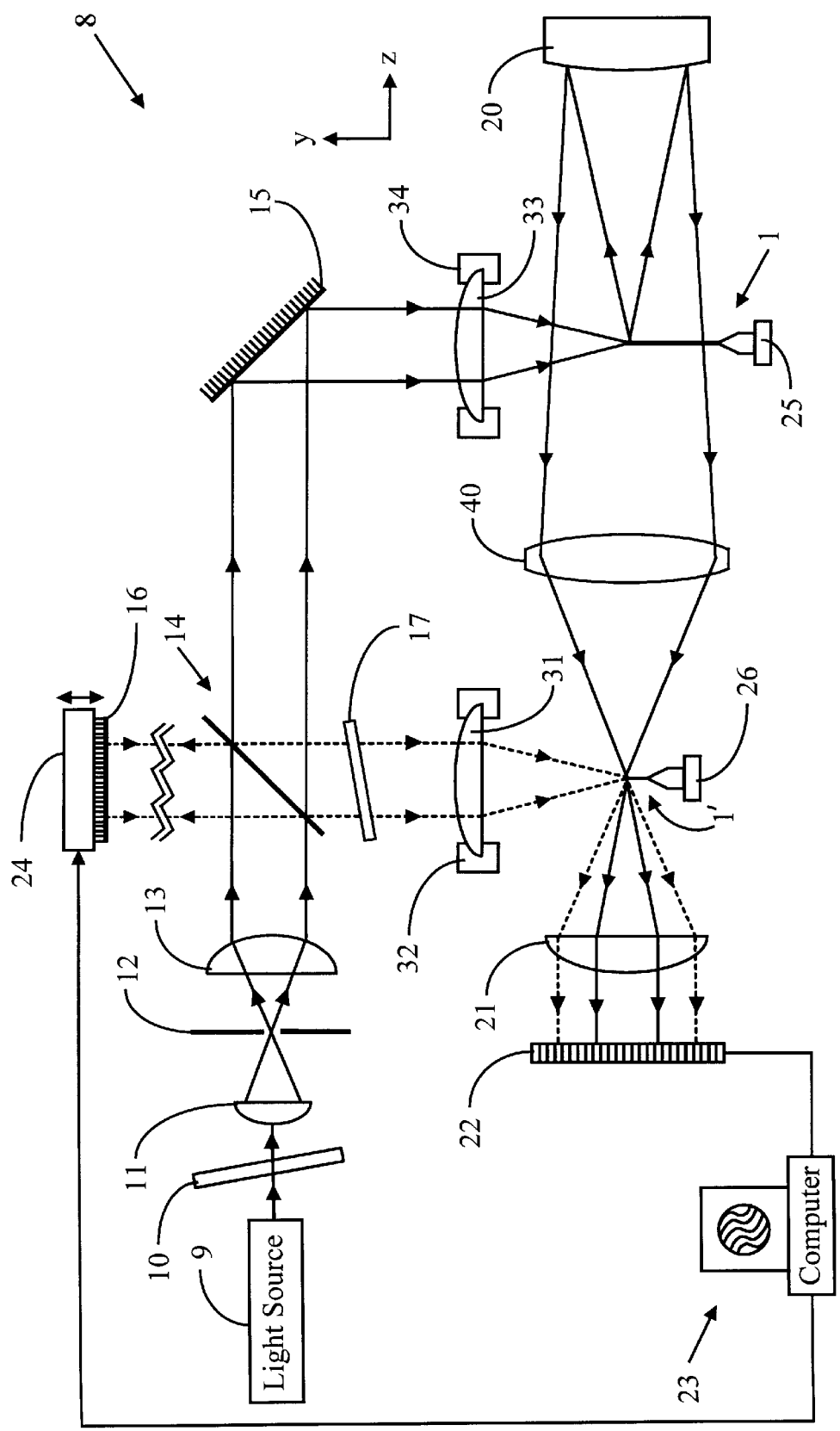
FIG. 15 is a view of a thirteenth embodiment of the interferometer for use with a convex hyperbolic surface.

The interferometer of FIG. 15 is useful for measuring surface figure error of a test object that has a hyperbolic convex surface. The interferometer of FIG. 15 includes a converging lens 40 arranged between the test object 20 and the reference pin mirror 1'. The lens 40 receives the return probe beam from the test object's surface, and focuses the return probe beam in the x-y plane of the reflective surface of the reference pin mirror 1'. The probe pin mirror 1 is located at the front focus of the test object for the same reason as mentioned with respect to FIG. 14, namely, to prevent the introduction of aberrations into the probe beam due to the test object's hyperbolic surface figure. In other respects, the configuration and operation of the interferometer of FIG. 15 are similar to those described with respect to FIGS. 3A and 3B, and FIG. 12.

The interferometers of FIGS. 3A through 15 are operated as follows. The light source 9 is activated to generate light of a predetermined wavelength. The attenuator 10 is adjusted to reduce the intensity of the light sufficiently so that an interference pattern can be formed without saturation. If the interferometer has the capability, the fringe contrast of the interference pattern generated by the interferometer is adjusted in one of two ways, depending upon the embodiment. In the interferometers of FIGS. 3A, 3B, 5A, 5B, 6A, 6B, 6C and 9–15, adjustment of the fringe contrast is accomplished through adjustment of the attenuator 17. In the interferometer of FIGS. 4A, 4B, fringe contrast adjustment is performed by controlling the orientation of the polarization axis of the polarizer 30. The focus of the probe and reference beams onto respective pin mirrors is accomplished by adjusting the stage 19 to move the lens 18 in FIGS. 3A, 3B, 4A, 4B, 5A, 5B, 9, 11, or both of the stages 32, 34 for respective lenses 31, 33 in FIGS. 6A, 6B, 8A, 8B, 10 and 12–15. The probe beam travels to the test object or system 20 and is disturbed according to its characteristics. From the test object or system, the probe beam interferes with the reference beam generated by the reference pin mirror, and travels to the detector. With an interferometer configuration in which the light blockage by pin mirror(s) in the path of the return probe beam is significant or in which backward diffraction, either scalar or vector, is required, the detector is calibrated so that its pixels have uniform sensitivities so that the intensity (or amplitude) distribution can be determined at the detector's surface. Scalar backward diffraction is required if no imaging lens exists in the interferometer and a relatively extreme measurement accuracy is required. Vector backward diffraction is required if no imaging lens exists in the interferometer, extremely high measurement accuracy is needed, and the numerical aperture of the test object is relatively moderate or high. Vector backward diffraction requires information concerning the electric-field direction of the light received at each pixel location. Preferably, the computer is programmed to perform scalar or vector backward diffraction, and the electric-field direction for vector backward diffraction is calculated from optics theory and stored in the computer's memory. The computer 23 reads and stores a frame of data for the pixel intensities and in addition the electric field direction if vector backward diffraction is necessary for the application to which the interferometer is applied. The computer increments the actuator 24 to shift the relative phase of the probe and reference beams, and reads and stores a data frame for each phase-shift increment to obtain a data set for one measurement. If a portion of the light traveling to the detector is blocked, the positions of the pin mirrors can be adjusted with respective stages 25, 26 so that they block light from reaching a different region of the detector that does not overlap the detector region blocked in the first measurement. The computer can be coupled to the stages to automate the switch in pin mirror positions, or the stages can be manipulated by hand or by an external control signal. An additional data set is obtained by the computer for the latest pin mirror positions. Also, using the embodiment of FIGS. 7A or 7B, a different pin mirror or pinhole can be moved into position to receive and diffract the probe beam. The computer can be coupled to the stage 25 to automate the switching of pin mirrors or pinholes of different numerical aperture used to generate the data set. Using the embodiments of FIGS. 7A or 7B, the computer can obtain more than one data set generated by pin mirrors or pinholes with different numerical apertures. In addition, particularly in the embodiments of FIGS. 6A, 6B or 6C, the wavelength of the light source can be changed, and an additional data set obtained by the computer for the latest light wavelength, a configuration useful for determining the chromatic aberrations of a test object or system. The computer obtains and generates data sets for respective light wavelengths, and uses these data sets to determine the test object of lens chromatic aberration characteristic.

Figure 16:
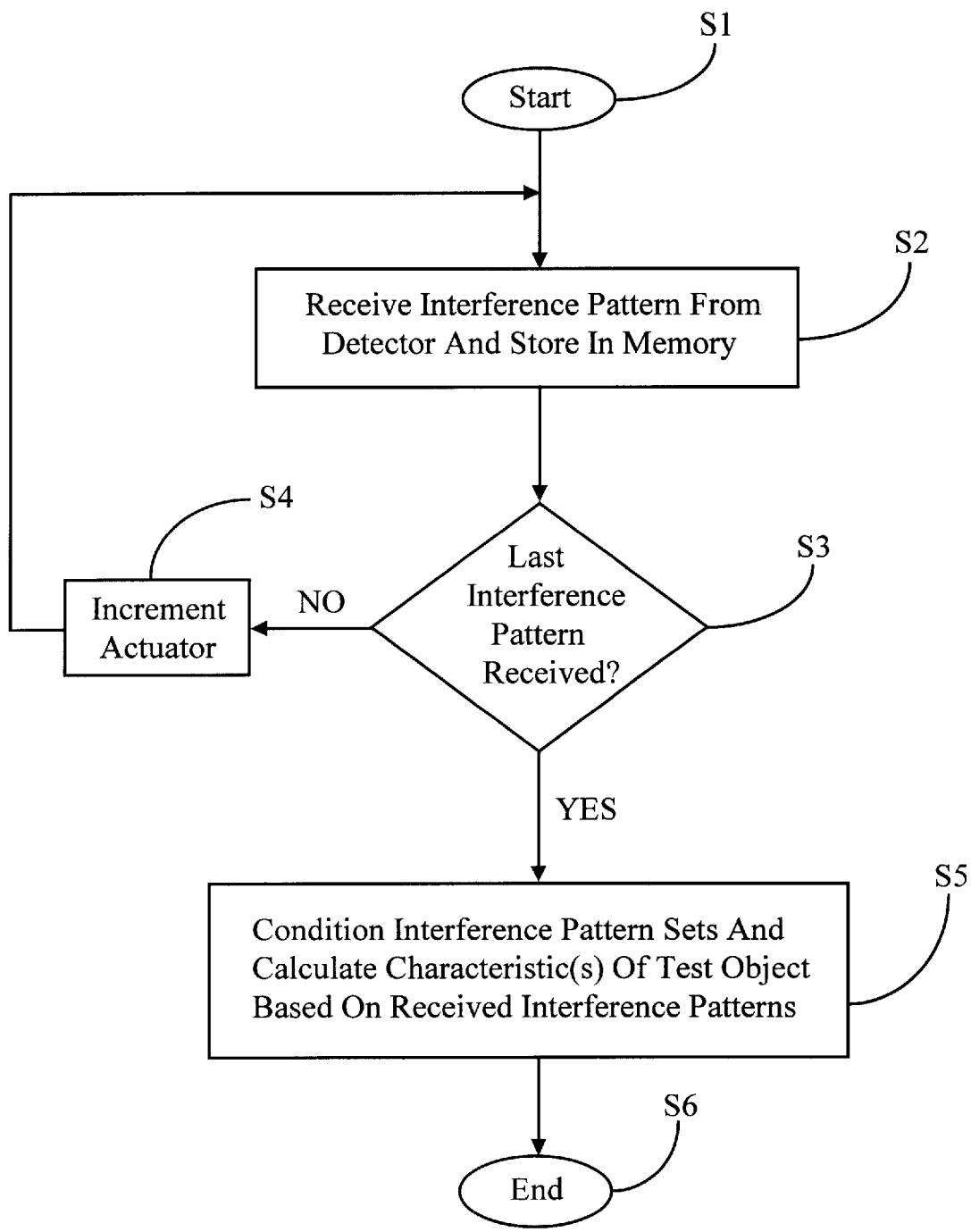
FIG. 16 is a flowchart of processing performed by a computer of the invented interferometers.

FIG. 16 is a flow chart of processing performed by the computer 23 to automate the measurement of the test object' or system's characteristics in the interferometers described with reference to FIGS. 3A–15. In FIG. 16, processing starts in step S1. In step S2, the computer's processor receives intensity from the interference pattern generated by the probe and reference beams at the detector's surface, and stores the intensity data in the processor's memory. In step S3, the processor determines whether the last interference pattern for the measurement process has been received by the computer from the detector. If not, in step S4, the processor generates and outputs a signal supplied to the actuator 24 to move the mirror 16 by a distance increment and thus affects a phase shift of the probe beam relative to the reference beam, and control returns to step S2. On the other hand, in step S3, if the processor determines that the last interference pattern has been received, processing proceeds to step S5. In step S5, the processor conditions the interference patterns. For example, in the interferometers of FIGS. 9–11 and 13–15, conditioning of the interference patterns involves subtracting data representing the aberrations produced by the lenses in these interferometers. In addition, in FIG. 10, the conditioning of the data set includes conversion of the data coordinates to account for the tilt of the test object. In step S5, the processor also calculates the test object or system characteristics based on the data extracted from the interference patterns. The calculation of the test object characteristics of interest (surface figure, field curvature, magnification, distortion, aberration, etc.) can be calculated from the data sets for a measurement using commercially-available software packages. If no imaging lens is used in the interferometer and relatively high measurement accuracy is required, the computer can be programmed to use the detected intensity to perform scalar backward diffraction for a test object with a relatively low numerical aperture, and vector backward diffraction for a test object with relatively moderate to high numerical aperture. To perform vector backward diffraction, the computer preferably uses pre-stored electric-field directions for respective pixels as well as corresponding pixel intensities output from the detector. The computer performs backward diffraction on each component of the electric-field to determine a test object characteristic such as surface figure. In step S6, the processing of FIG. 16 terminates.

If a pin mirror blocks a portion of the probe beam from reaching the detector, the probe pin mirror that is blocking the light, or alternatively the test object, is moved by a predetermined amount after the first measurement has been performed. Steps S1–S6 are then repeated to obtain a second data set that is used to supplement the data of the first set that is missing due to light blockage by the pin mirror.

To measure chromatic aberration, the light wavelength is changed through appropriate control of the light source, and steps S1–S6 of FIG. 16 are repeated for the latest light wavelength. The resulting data set can then be used with the first data set to determine chromatic characteristic, e.g., axial or chromatic aberrations, of the test object or system.

Figure 17:
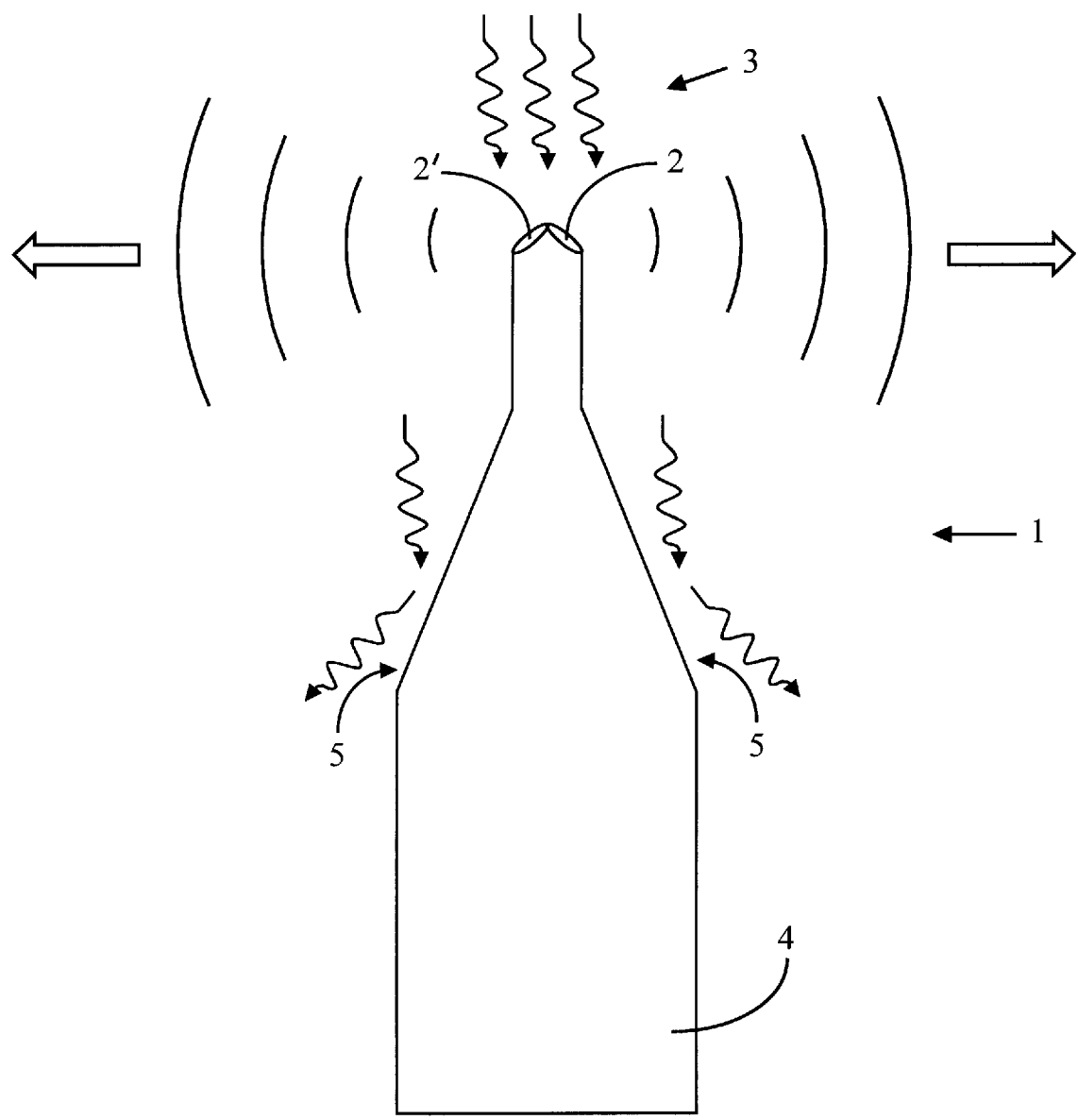
FIG. 17 is a third embodiment of the invented pin mirror.

The third embodiment of the pin mirror 1 of FIG. 17 includes two reflective surfaces 2, 2', one for the probe beam and the other for the reference beam. The reflective surface 2 diffracts and reflects the probe beam to the test object or system, and the reflective surface 2' diffracts and reflects the reference beam in a direction to interfere with the probe beam from the test object. As previously described with respect to FIG. 1, the pin 1 can be thermally coupled to a base 4 that receives and dissipates heat from the pin to prevent heat-generated noise from affecting the probe or reference beams.

Figure 18:
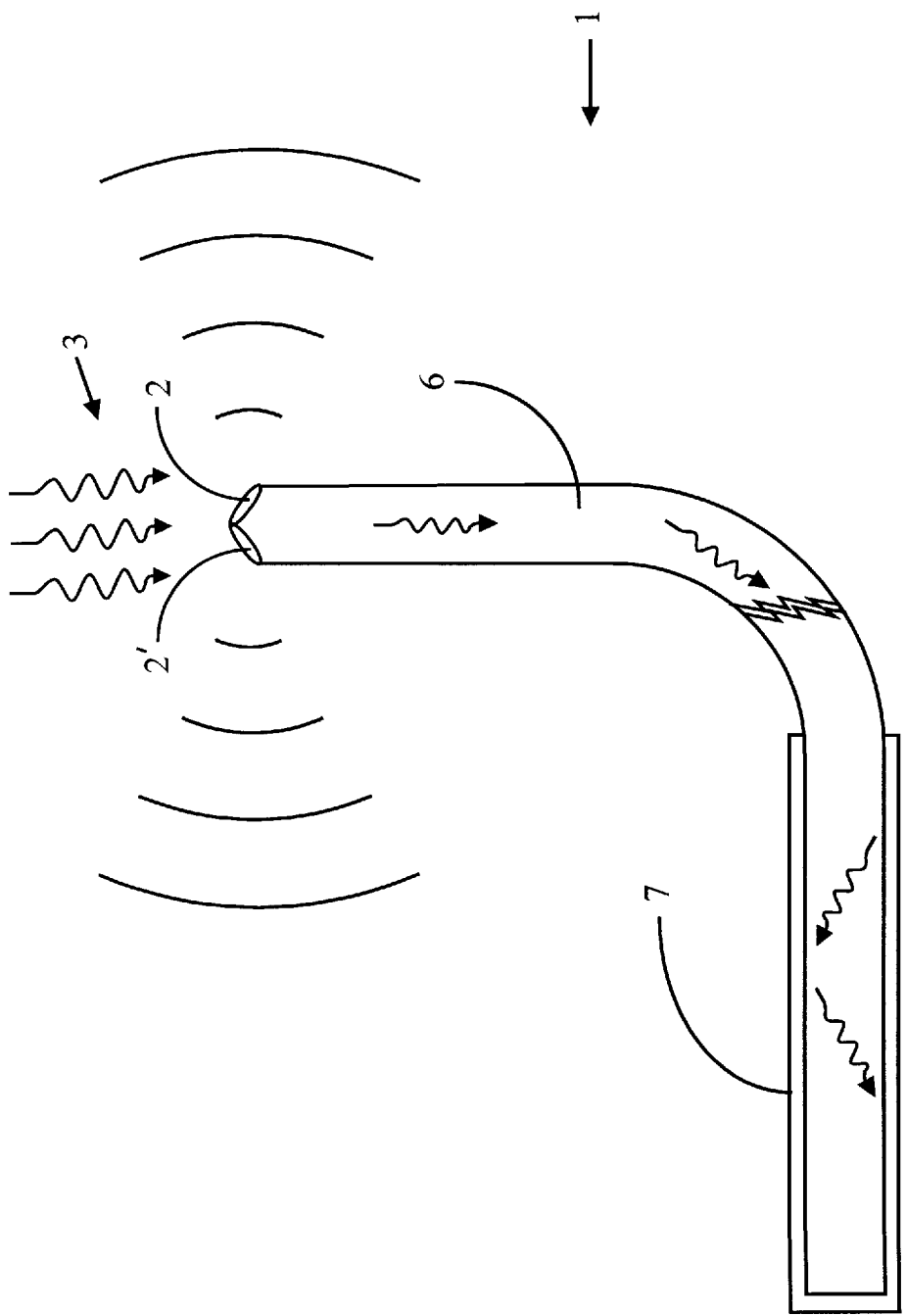
FIG. 18 is a fourth embodiment of the invented pin mirror with coupled light trap.

The fourth embodiment of the pin mirror 1 of FIG. 18 includes a light-transmissive optic fiber 6 with two reflective surfaces 2, 2' formed at one end. Like the pin mirror of FIG. 17, the pin mirror of FIG. 18 diffracts and reflects light to generate the probe and reference beams that travel in respective directions dictated by the angling of the surfaces 2, 2'. The optic fiber 6 receives by refraction about 75% to 95% of the light incident to the reflective surfaces and guides a significant portion, if not all, of such refracted light through its interior to the light trap 7. The light trap 7 captures and absorbs the light from the fiber's end, and also dissipates heat generated by light absorption to prevent significant heating of the reflective surfaces that could disturb the spherical wavefronts generated by the reflective surfaces.

The interferometer of FIGS. 19A and 19B is adapted for use with the pin mirror of either FIGS. 17 or 18. For effective use of the interferometer of FIGS. 19A and 19B, the source 9 should be a laser with a relatively long coherence length or alternatively the optical path difference of the probe beam relative to the reference beam should be approximately an even number times the length of the laser cavity of the source 9. The interferometer includes the following elements arranged as shown in FIGS. 19A and 19B. In FIG. 19A, the source 9 generates laser light supplied to the attenuator 10, lens 11, filter 12, lens 13 that function as previously described with respect to the interferometer of FIGS. 3A and 3B. The light travels to mirror 15 that reflects the light to focusing lens 18. The lens 18 focuses the light from the source 9 onto the two reflective surfaces 2, 2' of the pin mirror 1. As more clearly shown in FIG. 19B, the reflective surface 2 diffracts and reflects the probe beam in a direction to travel to the test object 20 that focuses the return probe beam in near proximity to the end of the pin mirror. The reflective surface 2' diffracts and reflects incident light to generate a reference beam that travels with the return probe beam through the lens 18 to form the interference pattern at the detector's surface. As with previously-described embodiments of the invented interferometer, the computer 23 is coupled to capture the signal generated by the detector 22 and stores the captured signal in its memory. To affect the phase shift of the probe and reference beams necessary to determine the test object's surface figure characteristic, the pin mirror is moved in the z-axis direction within a range of about $\lambda$, where $\lambda$ is the wavelength of the light generated by the source 9. Preferably, the positioning of the pin mirror is accomplished with a stage 25 to which the pin mirror is mounted. To automate the measurement process, the stage 25 can be coupled to receive control signals from the computer that control the position of the pin mirror along the z-axis in FIGS. 19A and 19B.

The interferometer of FIGS. 19A and 19B is operated as follows. The light source 9 is activated to generate light of a predetermined wavelength. The attenuator 10 is adjusted to reduce the intensity of the light sufficiently so that an interference pattern can be formed without saturation. The focus of the light beam generated by source 9 onto the dual-surfaced pin mirror 1 is accomplished by adjusting the stage 19 to move the lens 18 in a direction parallel to the light beam's path of travel through the lens 18. The dual-surfaced pin mirror diffracts and reflects the probe beam from one surface. The probe beam travels to the test object or system 20 and is disturbed according to its characteristics. From the test object or system, the probe beam interferes with the reference beam generated by the other surface of the pin mirror, and travels to the detector. If no imaging lens is used and relatively high accuracy is required, the detector should be calibrated so that its pixels have uniform sensitivities, and the computer should perform backward diffraction to the surface of the test object. The computer 23 reads and stores a frame of data for the pixel intensities and in addition the electric field direction if relatively extreme precision is required and no imaging lens is used. The computer increments the stage 25 along the z-axis direction in FIG. 19B, to introduce relative phase-shift between the probe and reference beams. The computer reads and stores a data frame for each phase-shift increment to obtain a data set. The computer uses the data set to determine the surface figure characteristic of the test object, for example, as previously explained with respect to FIG. 16.

As previously mentioned, the heat generated by the light incident to the pin mirror used in any of the invented interferometers described in this document can be a source of error in measurements of a test object's or system's characteristics. To further minimize heat-generated measurement errors, at least the pin mirrors (and preferably all elements except the computer 23) can be situated in an air-tight enclosure 41 shown in FIG. 19A, that is filled with an inert gas such as helium or evacuated altogether. Although its is shown only in FIG. 19A, the enclosure 41 can be provided for any of the invented interferometers described in this document. The helium or vacuum environment helps to prevent thermal wavefront disturbances of the probe and reference beams. Of course, for operation of the interferometers, the enclosure is evacuated with a pump (not shown), for example, to produce a vacuum environment. If a helium environment is used, the helium is introduced into the enclosure after evacuation of the enclosure. In other respects, operation of the interferometer using the enclosure is similar to the operation previously described herein.

The invented interferometers described in this document have several advantages over previously known interferometers. More specifically, the invented interferometers provide most, and in some embodiments all, of the following features: (1) the capability to shift the relative phase of the probe and reference beams to allow accurate extraction of the probe beam's phase relative to that of the reference beam; (2) no reference surface (for example, as required in Twymann-Green and Fizeau interferometers) that can be a major source of error in measuring the phase of the probe beam relative to an ideal or unperturbed reference beam, and hence the test object characteristic desired to be measured; (3) no critical optical element that can aberrate the probe or reference beam in a manner that cannot be compensated; (4) the capability to generate relatively high numerical aperture probe and reference beams to facilitate measurement of test objects with correspondingly high numerical apertures; (5) can be used with a wide variety of test objects and systems; (6) require no difficult and tedious alignment procedures needed to align the elements of the interferometer; and (7) reduce or even eliminate measurement errors caused by disturbance in the medium through which the probe and reference beams travel, caused by heat generated by the pin's absorption of light. In addition, there are several other advantageous features that are not present in many previously-known interferometers. These capabilities include the following: (8) the capability to measure the field curvature, magnification, distortion and chromatic aberrations of a test object or system; (9) the capability of testing an aspheric surface without the use and expense of a null lens; (10) the capability of detecting the high as well as the low spatial frequency components of the surface figure error of a test object; and (11) the capability to automate a part or the entirety of the measurement process used to measure the test object or system. Therefore, the invented interferometers provide capabilities far beyond those of previously-known interferometers, and can greatly improve the accuracy and precision of measurements of the characteristics of test objects and/or systems, as well as facilitate the characteristic measurement process.

The many features and advantages of the present invention are apparent from the detailed specification and thus, it is intended by the appended claims to cover all such features and advantages of the described apparatuses which follow in the true spirit and scope of the invention. Further, since numerous modifications and changes will readily occur to those of ordinary skill in the art, it is not desired to limit the invention to the exact construction and operation illustrated and described. Accordingly, all suitable modifications and equivalents may be resorted to as falling within the spirit and scope of the invention.

We claim:

1. A light receiving apparatus for use in an interferometer with a light source emitting light with a wavelength, $\lambda$, and with a test object with a numerical aperture, NA, the light receiving apparatus comprising:

a first pin mirror having a first reflective surface with a largest cross-width dimension that is less than the wavelength of said light divided by the numerical aperture of said test object, $\lambda/NA$, said reflective surface disposed to diffract the received light to generate a first light beam.

2. An apparatus as claimed in claim 1, wherein said first reflective surface of said first pin mirror refracts received light to generate a light beam with a diffraction-limited spherical wavefront.

3. An apparatus as claimed in claim 2, wherein said first reflective surface of said first pin mirror is substantially flat.

4. An apparatus as claimed in claim 2, wherein said first reflective surface of said first pin mirror is substantially convex.

5. An apparatus as claimed in claim 2 wherein said first reflective surface of said first pin mirror is angled to direct light reflected therefrom toward said test object when employed within said interferometer.

6. An apparatus as claimed in claim 2, wherein said first pin mirror is formed from a metal pin with said first reflective surface formed on a tip end of said metal pin.

7. An apparatus as claimed in claim 2, wherein said first pin mirror includes an optic fiber having a first end and a second end with said first reflective surface formed on said first end of the optic fiber.

8. An apparatus as claimed in claim 7, wherein said first reflective surface of said optic fiber absorbs no significant amount of light.

9. An apparatus as claimed in claim 7, wherein said first reflective surface of said optic fiber includes a dielectric coating.

10. An apparatus as claimed in claim 7, further comprising:
a light trap affixed to said second end of said optic fiber for absorbing light refracted into the optic fiber at said first reflective surface, with said second end relatively distance from said first reflective surface.

11. An apparatus as claimed in claim 10, wherein said light trap generates heat by absorbing light from said optic fiber, and wherein said light trap dissipates the heat, with said light trap located sufficiently away from said first reflective surface so that the dissipated heat does not disturb said light beam in proximity to said first reflective surface.

12. An apparatus as claimed claim 2, wherein said first pin mirror includes a second reflective surface with substantially the same cross-width dimensions as said first reflective surface, said second reflective surface for diffracting and reflecting received light to generate a second diffraction-limited spherical wavefront light beam, based on the light recieved by said second reflective surface.

13. An apparatus as claimed in claim 12, wherein, when employed within said interferometer, one of said two diffraction-limited spherical wavefronts from one of said first and second reflective surfaces is used for a probe beam that encounters said test object, and the other of said two diffraction-limited spherical wavefronts from the other of said first and second reflective surfaces is used as a reference beam that interferes with said probe beam reflected from said test object, to generate an interference pattern indicative of at least one optical characteristic of said test object.

14. An apparatus as claimed in claim 1, further comprising:
a second pin mirror having a reflective surface with substantially the same cross-width dimensions as the reflective surface of said first pin mirror with said reflective surface of said second pin mirror receiving light, and reflecting and diffracting the received light to generate a second light beam with a diffraction-limited spherical wavefront.

15. An apparatus as claimed in claim 14, wherein, when said first and second pin mirrors are employed within said interferometer, one of said first and second light beams from one of said first and second pin mirrors is used for a probe beam that encounters said test object, and the other of said first and second light beams from the other of said first and second pin mirrors is used as a reference beam that interferes with said probe beam reflected from said test object, to generate an interference pattern indicative of at least one optical characteristic of said test object.

16. An apparatus as claimed in claim 1, further comprising:
a thermally conductive base to which said first pin mirror is coupled for sinking and dissipating heat from said first pin mirror to prevent heat-generated disturbances of the spherical wavefront emanating from said first pin mirror.

17. An apparatus for detecting at least one optical characteristic of a test object, the apparatus comprising:
a light source for generating a light beam;
a beam splitter disposed to receive said light beam from said light source, said beam splitter dividing said received light beam into probe and reference beams;
a probe pin mirror arranged to receive said probe beam from said beam splitter, said probe pin mirror diffracting said probe beam and directing the diffracted probe beam toward said test object; and
a reference pin mirror arranged to receive said reference beam from said beam splitter, said reference pin mirror diffracting said reference beam and directing the diffracted reference beam in a direction to interfere with said probe beam reflected from said test object to generate an interference pattern indicative of at least one optical characteristic of said test object.

18. An apparatus as claimed in claim 17, wherein said test object has a numerical aperture of NA, and wherein said light source generates laser light with a wavelength $\lambda$, the largest cross-width dimensions of each reflective surface of said probe and reference pin mirrors that diffract said probe and reference beams being less than $\lambda/NA$.

19. An apparatus as claimed in claim 18, further comprising, intermediate said light source and said beam splitter:
a converging lens arranged to receive said light beam from said light source;
a filter defining a pinhole at a focus of said converging lens disposed to receive said light beam from said converging lens; and
a collimating lens arranged to receive said light beam passing from said converging lens through said filter's pinhole, with said collimating lens directing said light beam to said beam splitter.

20. An apparatus as claimed in claim 17, further comprising, intermediate said light source and said beam splitter:
an attenuator arranged to receive and attenuate said light beam from said light source, with said attenuated light beam traveling to said beam splitter.

21. An apparatus as claimed in claim 17, wherein:
said beam splitter has a first side and a second side with said first side arranged to receive said light beam from said light source; and
said apparatus further comprising:
a first mirror arranged to oppose said first side of said beam splitter; and
a second mirror arranged to oppose said second side of said beam splitter;
a first portion of said light beam reflecting from said first side of said beam splitter as one of said probe and reference beams to said first mirror, reflecting from said first mirror to said first side of said beam splitter, and passing therethrough to a corresponding one of said probe and reference pin mirrors; and
a second portion of said light beam being received by said first side and passing through said beam splitter as the other of said probe and reference beams, reflecting from said second mirror to said second side of said beam splitter, and reflecting from said second side of said beam splitter to the other corresponding one of said probe and reference pin mirrors.

22. An apparatus as claimed in claim 21, further comprising:
an attenuator arranged between said beam splitter and one of said first and second mirrors, said attenuator attenuating the corresponding one of said probe and reference beams to adjust a fringe contrast of said interference pattern.

23. An apparatus as claimed in claim 21, wherein said first and second mirrors are tilted in opposite directions with respect to an optical axis of said beam splitter, to direct said probe and reference beams to said respective probe and reference pin mirrors positioned at separate locations.

24. An apparatus as claimed in claim 21, wherein said beam splitter is tilted to direct said probe and reference beams to said respective probe and reference pin mirrors positioned at separate locations.

25. An apparatus as claimed in claim 21, further comprising:
an actuator coupled to and adjustable to move one of said first and second mirrors in a direction substantially parallel to the direction of travel of the one of said probe and reference beams incident said one of said first and second mirrors coupled to said actuator, said actuator controllable to move the one of said first and second mirrors to introduce a phase shift between said probe and reference beams.

26. An apparatus as claimed in claim 21, wherein:
said beam splitter is a polarization beam splitter; and
the apparatus further comprising:
a polarization rotator arranged between said light source and said beam splitter, for controlling the polarization direction of said light beam;
a first quarter-wave plate arranged between said beam splitter and said first mirror, for rotating the polarization direction of one of said probe and reference beams;
a second quarter-wave plate arranged between said beam splitter and said second mirror, for rotating the polarization direction of the other of said probe and reference beams; and
a polarizer arranged between said beam splitter and said probe and reference pin mirrors, for polarizing said probe and reference beams in a direction determined by the radial position of said polarizer to adjust fringe contrast of an interference pattern generated with said probe and reference beams.

27. An apparatus as claimed in claim 21, wherein said first and second mirrors are arranged at different distances from said beam splitter to equalize the optical paths traveled by said probe and reference beams in said apparatus.

28. An apparatus as claimed in claim 21, further comprising:
a focusing lens arranged to receive said probe and reference beams from said beam splitter, said focusing lens focusing said probe and reference beams on said probe and reference pin mirrors, respectively.

29. An apparatus as claimed in claim 21, further comprising:
a converging lens arranged between said probe pin mirror and said test object, said converging lens receiving said diffracted probe beam from said probe pin mirror and directing said diffracted probe beam to said test object, and receiving said light beam from said test object and focusing said light beam from said test object on a focal plane including said reference and probe pin mirrors.

30. An apparatus as claimed in claim 21, further comprising:
a collimating lens arranged between said probe pin mirror and said test object, said collimating lens receiving said light beam reflected from said probe pin mirror and directing said reflected light beam to said test object, and receiving said reflected light beam from said test object and focusing said reflected light beam from said test object to a focal plane including said reference and probe pin mirrors.

31. An apparatus as claimed in claim 17, wherein:
said beam splitter has first and second sides with said first side arranged to receive said light beam from said light source; and
the apparatus further comprising:
a mirror arranged to oppose said second side of said beam splitter with one of said probe and reference beams reflecting from said beam splitter to a corresponding one of said probe and reference pin mirrors, and the other of said probe and reference beams passing through said beam splitter and reflecting from said mirror to the other of said probe and reference pin mirrors.

32. An apparatus as claimed in claim 31, further comprising:
an actuator coupled to said mirror to move said mirror to phase shift the one of said probe and reference beams reflected therefrom relative to the other of said probe and reference beams.

33. An apparatus as claimed in claim 31, further comprising:
an attenuator arranged between one of said beam splitter and said mirror, and said beam splitter and one of said probe and reference pin mirrors, said attenuator for adjusting contrast between fringes of said interference pattern.

34. An apparatus as claimed in claim 31, further comprising:
a first focusing lens disposed between said beam splitter and said probe pin mirror to receive said light beam from said beam splitter and to focus said light beam on said probe pin mirror; and
a second focusing lens disposed between said mirror and said reference pin mirror to receive said light beam from said mirror and to focus said light beam on said reference pin mirror.

35. An apparatus as claimed in claim 31, wherein:
said beam splitter is a polarization beam splitter; and
the apparatus further comprising:
a polarization rotator arranged between said light source and said beam splitter; and
a half-wave plate arranged between said beam splitter and said mirror.

36. An apparatus as claimed in claim 31, wherein said test object is situated between said probe pin mirror and said reference pin mirror.

37. An apparatus as claimed in claim 36, further comprising:
a converging lens arranged between said probe pin mirror and said test object, said converging lens directing said probe beam from said probe pin mirror to said test object;
wherein said test object is arranged at an angle to reflect said light beam therefrom to a focal plane at which said reference pin mirror is disposed.

38. An apparatus as claimed in claim 31, wherein:
said beam splitter has first and second sides with said first side arranged to receive light from light source; and
the apparatus further comprising:
a first mirror arranged to oppose said first side of said beam splitter; and
a second mirror arranged to oppose said second side of said beam splitter;
one of said probe and reference beams reflecting from said first side of said beam splitter to said first mirror, reflecting from said first mirror to said first side of said beam splitter and passing therethrough to one of said probe and reference pin mirrors; and the other of said probe and reference beams passing through said beam splitter from said first side to said second side, and reflecting from said second mirror to the other of said probe and reference pin mirrors.

39. An apparatus as claimed in claim 38, further comprising:

an actuator coupled to said first mirror to adjust the position of said first mirror along a direction substantially parallel to a direction in which said one of said probe and reference beams travels to said first mirror from said beam splitter.

40. An apparatus as claimed in claim 38, further comprising:

an attenuator arranged between said beam splitter and one of said probe and reference pin mirrors, to adjust a fringe contrast of said interference pattern.

41. An apparatus as claimed in claim 38, further comprising:

a first focusing lens arranged between said beam splitter and one of said probe and reference pin mirrors, for focusing a corresponding one of said probe and reference beams on a corresponding one of said probe and reference pin mirrors; and a second focusing lens arranged between said second mirror and the other of said probe and reference pin mirrors, for focusing the corresponding one of said probe and reference beams on the corresponding one of said probe and reference pin mirrors.

42. An apparatus as claimed in claim 38, further comprising:

a collimating lens arranged to receive said probe beam from said test object, and to focus said probe beam from said test object on a focal plane at which said reference pin mirror is positioned.

43. An apparatus as claimed in claim 38, further comprising:

a converging lens arranged to receive said probe beam from said test object, and to focus said probe beam from said test object on a focal plane at which said reference pin mirror is positioned.

44. An apparatus as claimed in claim 18, further comprising:

a detector arranged to receive said interference pattern to generate an electric signal corresponding to said interference pattern.

45. An apparatus as claimed in claim 44, wherein said detector includes a two-dimensional charge-coupled device (CCD) array.

46. An apparatus as claimed in claim 44, wherein said detector includes a two-dimensional charge-injection device (CID) array.

47. An apparatus as claimed in claim 44, further comprising:

an imaging lens arranged to receive said reflected probe beam from said test object and said reference beam from said reference pin mirror, to image said test object onto said detector surface and to substantially collimate said probe and reference beams.

48. An apparatus as claimed in claim 44, further comprising:

a computer coupled to receive said electric signal from said detector and to generate a display indicative of at least one optical characteristic of said test object.

49. An apparatus as claimed in claim 18, further comprising:

a detector arranged to receive said interference pattern generated by said probe and reference beams, said detector having pixels formed on a surface with the pixels calibrated to have substantially the same light-sensitivity, the pixels outputting respective light intensities based on the interference pattern, with said detector generating a detection signal based on the outputs of the pixels; and a computer coupled to said detector to receive said detection signal, said computer calculating complex amplitudes for respective pixels, and performing backward diffraction that diffracts said probe beam from said detector surface to the surface of said test object to determine the surface figure characteristics of said test object, based on the complex amplitudes of respective pixels.

50. An apparatus as claimed in claim 18, the apparatus further comprising:

at least one stage supporting at least one of said probe and reference pin mirrors, said stage movable to change the position of said at least one of said probe and reference pin mirrors;

a detector arranged to receive the interference pattern generated by said probe and reference beams, said detector generating a complex amplitude distribution at said detector surface based on the interference pattern; and a computer coupled to said detector, said computer capturing and storing first and second data sets with said probe and pin mirrors located at different positions, said computer performing Fourier transforms on the complex amplitude distributions of the first and second sets, and filling in missing spatial frequency bands of the first data set with those from the second data set;

wherein at least one of said probe and reference pin mirrors block a portion of said probe and reference beams from reaching said detector.

51. An apparatus as claimed in claim 18, wherein at least one of said first and second pin mirrors includes an optic fiber having first and second ends with a reflective surface formed on said first end thereof with said optic fiber guiding said beam refracted at said reflective surface of said optic fiber away from said first end.

52. An apparatus as claimed in claim 51, further comprising:

a light trap affixed to said second end of said optic fiber to capture light refracted into said optic fiber at said reflective surface on said first end of said optic fiber, said light trap substantially absorbing said light received from said optic fiber.

53. An apparatus as claimed in claim 52, wherein said light trap dissipates heat generated by absorption of said light at a rate sufficient to prevent heating of at least said reflective surface of said first end of said optic fiber.

54. An apparatus as claimed in claim 18, further comprising:

an enclosure containing helium enclosing at least said probe and reference pin mirrors.

55. An apparatus as claimed in claim 18, further comprising:

an enclosure sustaining a vacuum environment enclosing at least said probe and reference pin mirrors.

56. An apparatus as claimed in claim 18, further comprising:

a pin mirror supporting base disposed to receive a plurality of probe pin mirrors; and at least one additional probe pin mirror arranged on said base, each said additional probe pin mirror having a different largest cross-width dimension to accommodate differing combinations of light sources and test objects with different wavelength and numerical aperture combinations.

57. An apparatus as claimed in claim 56, wherein said base sinks and dissipates heat generated by said probe pin mirrors by conduction of heat therefrom.

58. An apparatus as claimed in claim 56, wherein said base has shoulders angled to deflect light away from probe beams generated from one of said probe pin mirrors.

59. An apparatus as claimed in claim 17, further comprising:
an optic fiber arranged to receive said light beam from said light source and to guide said light beam from said light source to an input side of said beam splitter.

60. An apparatus as claimed in claim 17, further comprising:
an optic fiber arranged to receive said probe beam from said beam splitter and to guide said probe beam to said probe pin mirror.

61. An apparatus as claimed in claim 17, further comprising:
an optic fiber arranged to receive said reference beam from said beam splitter and to guide said reference beam to said reference pin mirror.

62. An apparatus for detecting at least one optical characteristic of a test object, the apparatus comprising:
a light source generating a light beam;
a beam splitter arranged to receive said light beam from said light source, said beam splitter dividing said light beam into probe and reference beams;
a plate member disposed to receive said probe beam from said beam splitter and defining a pin hole therethrough to diffract said probe beam passing through said pin hole to generate a beam having a spherical wavefront direct to said test object; and
a reference pin mirror arranged to receive said reference beam from said beam splitter, to diffract said reference beam and to direct said diffracted reference beam in a direction to interfere with said probe beam reflected from said test object to generate an interference pattern indicative of at least one characteristic of said test object.

63. An apparatus as claimed in claim 62, further comprising:
an optic fiber arranged between said beam splitter and said pin hole in said plate member to conduct said probe beam to said pin hole for emission and diffraction to generate a spherical wavefront traveling to said test object.

64. An apparatus as claimed in claim 62, further comprising:
an optic fiber arranged between said beam splitter and said reference pin mirror to conduct said reference beam to said reference pin.

65. An apparatus as claimed in claim 62, further comprising:
a plate member defining a pinhole, and arranged to receive and diffract the probe beam to generate a spherical wavefront.

66. An apparatus as claimed in claim 62, wherein:
said plate member defines a plurality of differently-sized pinholes;
the apparatus further comprising:
a stage coupled to said plate member, for moving a selected one of said pinholes into said path of said probe beam to generate said spherical wavefront.

67. An apparatus for detecting at least one characteristic of a test object, the apparatus comprising:
a light source generating a light beam;
a pin mirror having first and second reflective surfaces, said first reflective surface diffracting and directing a probe beam in a first direction toward said test object, and said second reflective surface diffracting and directing a reference beam in a second direction;
said probe beam reflecting from said test object in said second direction to interfere with said reference beam to generate an interference pattern indicative of at least one optical characteristic of said test object.

68. An apparatus as claimed in claim 67, wherein said test object has a numerical aperture of NA, said light source generates laser light with a wavelength $\lambda$, and the largest cross-width dimensions of each of said first and second reflective surfaces is less than $\lambda/NA$.

69. An apparatus as claimed in claim 67, wherein said pin mirror includes an optic fiber having first and second ends, said first and second reflective surfaces formed on said first end of said optic fiber.

70. An apparatus as claimed in claim 69, the apparatus further comprising:
a light trap coupled to said second end of said optic fiber to receive and absorb the light refracted into said optic fiber at said first end of said optic fiber.

71. An apparatus as claimed in claim 67, further comprising:
a thermally conductive base to which said pin mirror is coupled for sinking and dissipating heat from said pin mirror to prevent heat-generated disturbances of said probe and reference beam wave fronts.

72. A light receiving apparatus for use in an interferometer with a light source emitting light with a wavelength, $\lambda$, and with a test object with a numerical aperture, NA, the light receiving apparatus comprising:
a plate member defining a pin hole therethrough with a largest cross-width dimension that is less than the wavelength of said light divided by the numerical aperture of said test object, $\lambda/NA$, said pin hole disposed to diffract the received light to generate a light beam with a diffraction-limited spherical wavefront.

73. An apparatus as claimed in claim 72 wherein said plate member is thermally conductive for sinking and dissipating heat to prevent heat-generated disturbances of the spherical wavefront emanating from said pin hole.

74. An apparatus as claimed in claim 62 wherein:
said light source produces a light beam having a wavelength, $\lambda$, and said test object has a numerical aperture, NA; and
each of said pin hole in said plate member and said reference pin mirror a largest cross-width dimension that is less than the wavelength of said light beam divided by the numerical aperture of said test object, $\lambda/NA$.

* * * * *